United States Patent [19]

Seno

[11] Patent Number: 5,086,732

[45] Date of Patent: Feb. 11, 1992

[54] FOUR STROKE CONCENTRIC OSCILLATING ROTARY VANE INTERNAL COMBUSTION ENGINE

[76] Inventor: Cornelio L. Seño, 10718 Nathanson Ave., Cupertino, Calif. 95014

[21] Appl. No.: 578,674

[22] Filed: Sep. 7, 1990

[51] Int. Cl.5 .............................................. F02B 53/00
[52] U.S. Cl. ...................... 123/18 R; 91/339
[58] Field of Search ........ 123/18 R, 190 BA, 190 BB, 123/559.1; 60/315; 91/33.9

[56] References Cited

U.S. PATENT DOCUMENTS

| | | | |
|---|---|---|---|
| 487,313 | 12/1892 | Withers | 123/18 R |
| 725,087 | 4/1903 | Jenney | 123/18 R |
| 937,653 | 10/1909 | Sickenberger | 60/315 |
| 1,473,199 | 11/1923 | Peraza | 123/18 R |

Primary Examiner—Michael Koczo

[57] ABSTRACT

The four stroke concentric oscillating rotary vane internal combustion engine performs the four stroke Otto cycle inside four arcuate combustion chambers formed between the shell, rotor cylinder and two transverse end plates analogous to the engine cylinder; two fixed diametrically opposed vanes inwardly projecting from the shell serving as cylinder heads; and two fixed diametrically opposed vanes projecting outwardly from the rotor cylinder functioning as pistons. An output shaft mechanism orchestrates the synchronized operations of the fuel injection and spark ignition systems, pair of cranking mechanisms controlling the rotary strokes of the rotor, and pair of forced porting mechanisms forcing the complete removal of combustion by-products from and sufficient supply of air into the combustion chambers.

1 Claim, 21 Drawing Sheets

LEGEND

AIR

FUEL

MIXTURE OF FUEL AND AIR

EXHAUST GAS

EXPLOSION

DIRECTION OF STROKE OR ROTATION

SEAL

BALL BEARING

FUEL INJECTOR NOZZLE

SPARK PLUG

SLEEVE BEARING

KEY (TOP AND SIDE VIEWS)

STUD BOLT AND NUT

SET SCREW

FOUR STROKE CONCENTRIC OSCILLATING ROTARY VANE INTERNAL COMBUSTION ENGINE

BACKGROUND OF THE INVENTION

1. Field of the Invention

The present invention relates to the field of internal combustion engines and in particular to oscillating types for vehicular application.

2. Description of related art

The most popular internal combustion engine for vehicular application, the piston-cylinder type, is inefficient for three reasons. First is that it is necessary to throw away about one third of the heat of combustion in order to keep the cylinder head, valves and springs at desirable operating temperature. Otherwise, the engine becomes inoperative when the valve springs set and relaxate, or the cylinder head breaks when the valves expand in their seats. Moreover, severe thermal distortion between the cool parts around the air intake valves and the hot parts around the exhaust discharge valves due to high operating temperature increases the risk of breaking the cylinder head. Second is that much mechanical power dissipates back into unbeneficial heat on account of excessive friction between rubbing parts. Third is that there is always incomplete combustion of fuel because exhaust is not totally discharged from the combustion chamber during the exhaust stroke in the four stroke engine and scavenging in the two stroke engine. The carbon dioxide and water vapor remaining inside the combustion chamber during the intake stroke are not capable of oxidizing fuel mixing with them. Moreover they decrease the air capacity of the engine. The result is incomplete combustion and presence of unburnt fuel and carbon monoxide in the exhaust.

The piston-cylinder reciprocating internal combustion engine has a heavy weight to output power ratio because of extra weights contributed by water and metal parts of the cooling system as well as there is only half to one power cycle per working chamber for every shaft rotation or two strokes.

In spite of its inefficiency and heavy weight to power ratio, the piston-cylinder reciprocating internal combustion engine is still the most popular and developed reciprocating internal combustion engine due to its general economy and satisfaction of its users.

SUMMARY OF THE INVENTION

The four stroke concentric oscillating rotary vane internal combustion engine is conceived with the end view of competing with the piston-cylinder reciprocating internal combustion engine in efficiency cost and pollution control.

Consequently, the objects of this invention are maximum thermal and mechanical efficiencies, exclusion of cooling system, minimum thermal distortion, one power stroke every rotational stroke of the rotor, complete elimination of products of combustion from the combustion chamber during the exhaust stroke, filling the combustion chamber with maximum amount of air during the intake stroke and less friction.

These objects are achieved in the four stroke concentric oscillating rotary vane internal combustion engine designed for the continuous application of power to the rotor and capable of complete combustion of the fuel. This engine exhibits high efficiency of converting heat of combustion into work because it operates at maximum possible temperature, radiator and water cooling system are not required and so, absent, friction is minimal, exhaust gas is completely discharged during exhaust stroke, and pure air in more than enough quantity mixes with fuel before ignition.

Since the engine has no valves and springs to protect from high temperature, the engine runs at maximum possible temperature. Although the engine's compression ratio is only 9:1, the heat accumulated in the engine is absorbed by the combustion media which somehow increases the combustion temperature. As working temperature goes up, so is the efficiency of the engine.

This efficiency is enhanced by excluding the not required cooling system inasmuch as air convection assists economically in the cooling of the metal parts of the engine.

Moreover, less friction is encountered inside the engine because the rotor and stator are coaxial, there is minimum thermal distortion on account of uniform heat distribution, air and gas trapped in grooves in rubbing parts of rotor and stator serve as effective dynamic seal and lubricant, and the bearings are in oil bath.

The invention is basically a hybrid between the rotary vane and piston-cylinder engines. Although, it has fixed concentric vanes in both rotor and stator, the invention's rotary motion is oscillating. Also, its arcuate combustion chambers utilize the stator vanes as cylinder heads and the rotor vanes as pistons.

The transverse section of the rotor is simply a circle (rotor cylinder) with a pair of diametrically outwardly opposing bars (rotor vanes). On the other hand, the transverse section of the stator is simply a figure with a circular internal surface (shell) with a pair of diametrically inwardly opposing bars (stator vanes). When the rotor is mounted inside the stator, four arcuate combustion chambers are formed. Each pair of combustion chambers separated by a stator vane are freed from exhaust gas during exhaust stroke and filled with air during intake stroke by a forced porting mechanism located in the stator vane. Each pair of combustion chambers separated by the rotor vane are supplied with fuel through a fuel injector nozzle located in the shell midway between the two stator vanes.

The invention works similarly as a four stroke piston-cylinder reciprocating engine. Consequently, there is one power stroke every rotational stroke of the rotor.

DESCRIPTION OF DRAWINGS

The accompanying drawings show the preferred embodiment of the invention, in which.

Similar characters and numerals of reference indicate corresponding parts in the different figures of the drawings.

DESCRIPTION OF PREFERRED EMBODIMENT

The following analysis enumerates and explains the various parts of the invention as well as clarifies its operation.

The invention is the four stroke concentric oscillating rotary vane internal combustion engine made up of a rotor AB, a stator D, two cranking mechanisms L, L, two forced porting mechanisms P, P, an output shafts mechanism V, fuel injection system of a four cylinder diesel engine, the spark ignition system of a four cylinder gasoline engine, and the governor controlling the speed of the engine. The rotor AB is mounted inside the stator D which in turn is anchored to the chassis of the vehicle. In between the rotor AB and the stator D are four opposed and complementary arcuate combustion chambers I, II, III, IV performing the four stroke Otto cycle. The output shafts mechanism V orchestrates and coordinates the synchronized operations of the cranking mechanisms L, L, forced porting mechanisms P, P, fuel injection system and spark ignition system to meet the operational requirements of the engine AZ shown in FIGS. 1, 2, 3 and 4.

Rotor

Figure 7:
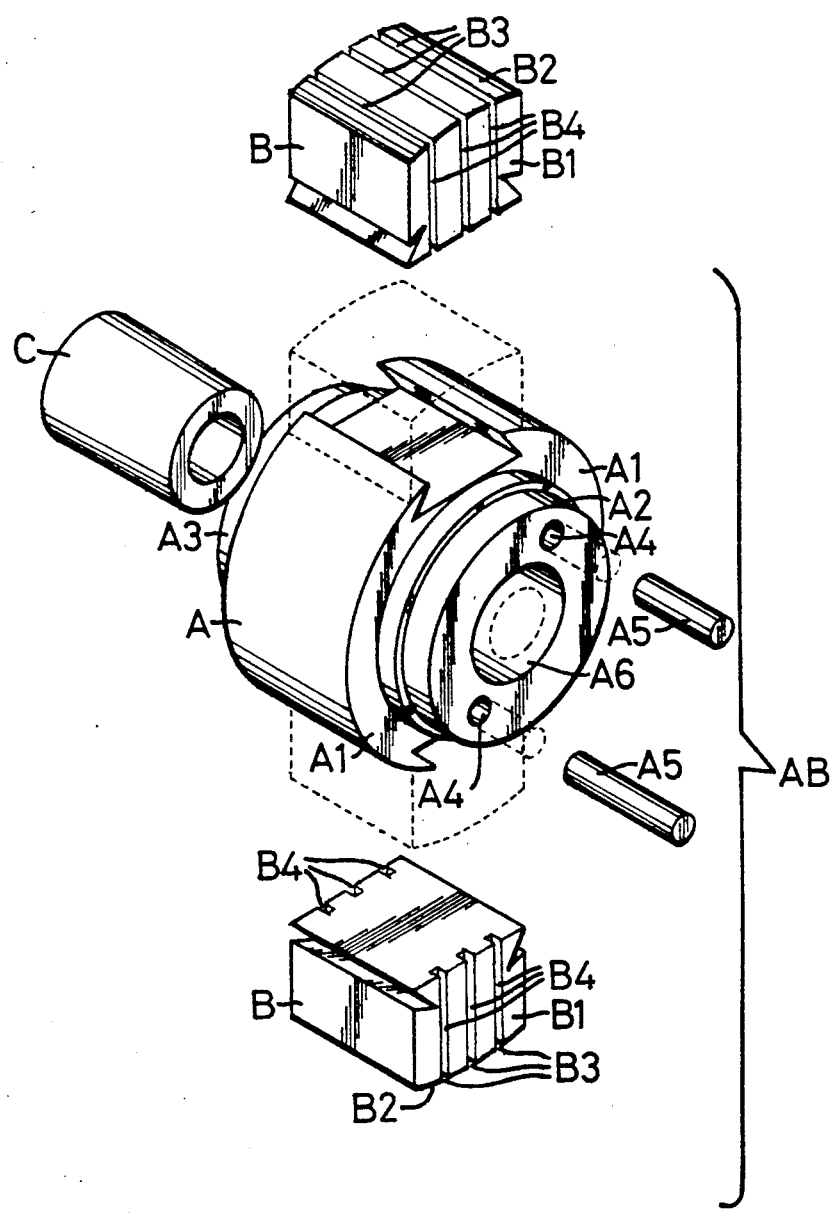
FIG. 7 is the exploded view of the rotor.

The rotor AB of the engine AZ shown in the drawings and particularly in FIG. 7, basically consists of the right circular cylinder A and two generally rectangular and diametrically opposing vanes B, B dovetailed and projecting outwardly from the rotor cylinder A, giving a transverse section similar to the Greek character Psi, $\phi$.

At each side, front or rear, the radial edges A1 B1, B1 of the rotor cylinder A and rotor vanes B, B are on the same plane normal to the axis of the rotor AB.

The axial length of the rotor AB is substantially equal to the axial length of the shell J, which is also the axial length of the combustion chambers I, II, III and IV.

The convex axial edges B2, B2 of the rotor vanes B, B are coaxial with the rotor cylinder A and have identical radius of curvature substantially equal to the internal radius of the shell J.

For mounting and support purposes, two axially opposing and coaxial right circular hollow cylindrical journals A2, A3 project outwardly and coaxially from the rotor cylinder A.

The front rotor journal A2 has two diametrically opposing cylindrical holes A4, A4 parallel to and equidistant from the rotor axis into which the rotor pins A5, A5 are force fitted.

To promote sealing and minimize friction at rubbing contacts between the shell J and the rotor vanes B, B the latter's convex axial edges B2, B2 have longitudinal grooves B3, B3, etc. running parallel to the rotor axis. To achieve the same at rubbing contacts between the end plates E1, G1 and the rotor vanes B, B, the latter's radial edges B1, B1 have parallel transverse grooves B4, B4, etc. running normal to the rotor axis. During normal operation, the grooves contain air and gas serving as seal and lubricant.

The rotor AB has a central axial hole A6 holding snugly the main shaft sleeve bearing C.

Stator

The stator D is a tri-compartment housing comprising the crank case EF in front, the output shaft gear box GH at the rear and the working chamber JK in between them. See FIGS. 1, 3 and 5.

Figure 8:
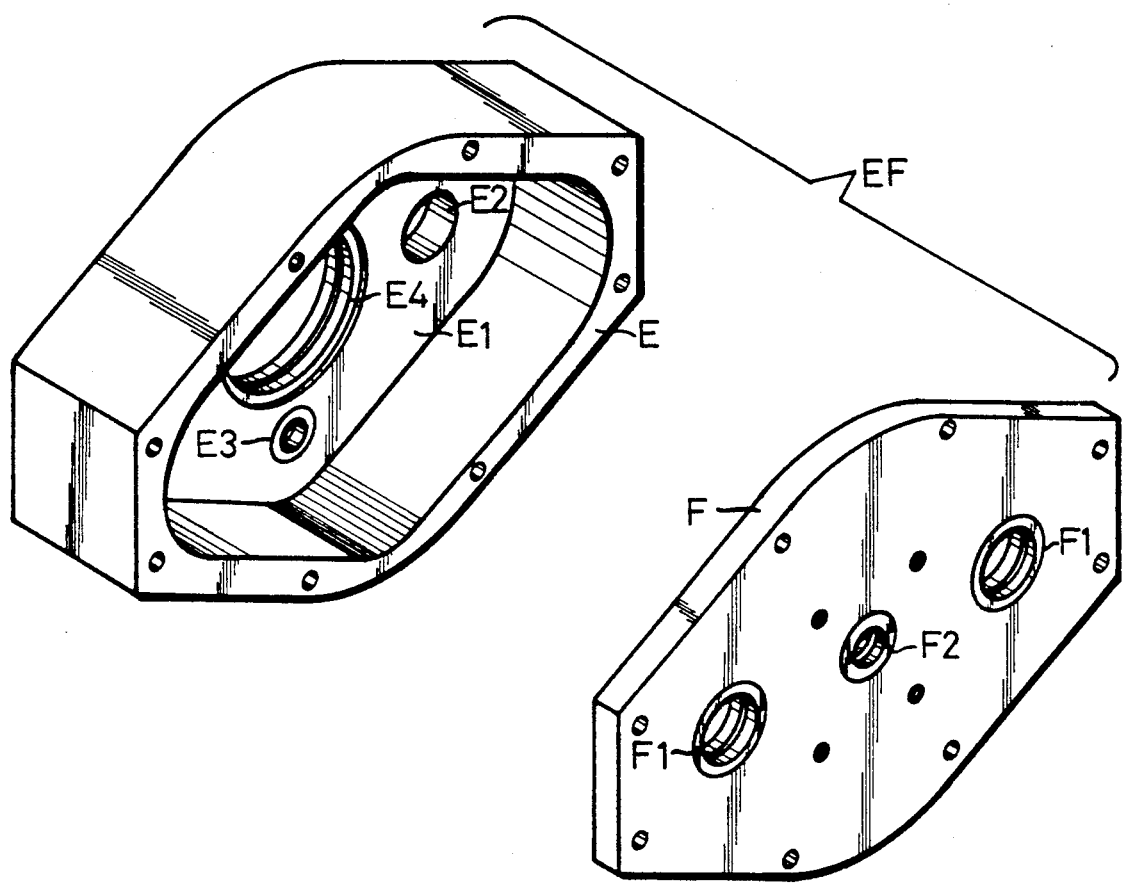
FIG. 8 is the isometric front view of parts of the crank case.

FIG. 8 shows that the crank case EF consists of the crank case body E and the crank case cover plate F. The crank case body E has a transverse wall E1 at the rear serving as front end plate of the working chamber JK. The crank case body E is recessed in front to accommodate the two cranking mechanisms L, L, the big gear X of the main shaft W, the gears Q1, Q1 of the two forced porting mechanisms P, P and the oil lubricating the gears and bearings inside the crank case EF.

Figure 9:
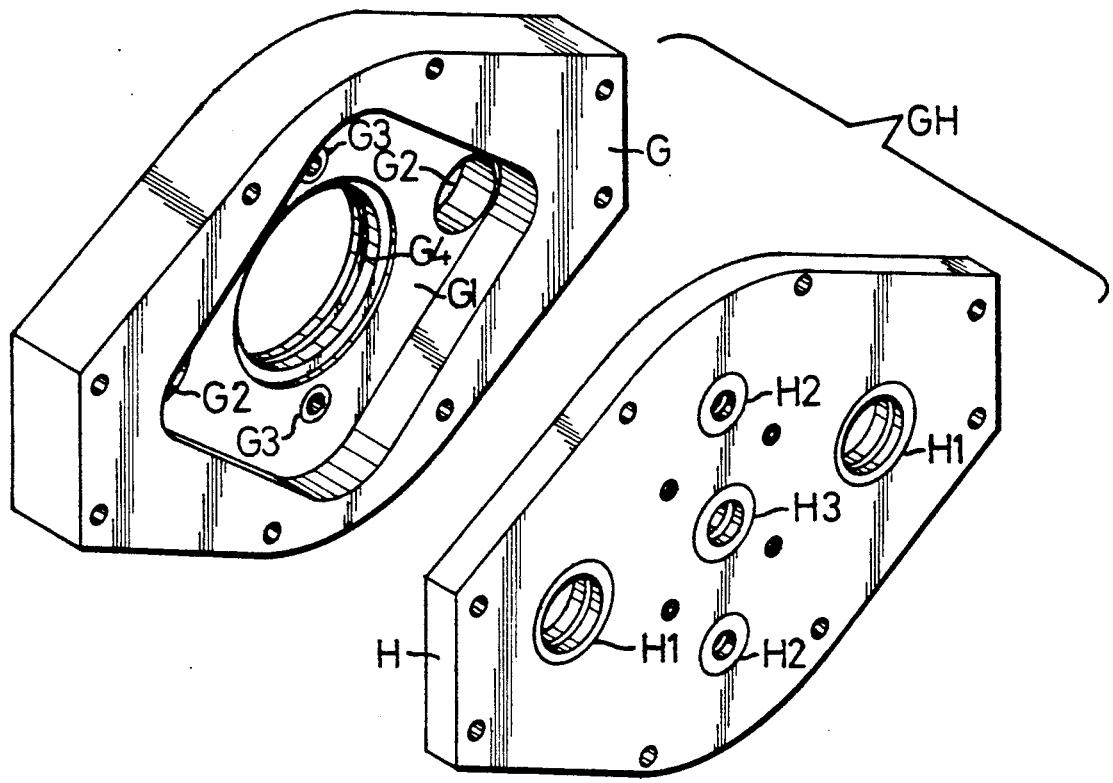
FIG. 9 is the isometric rear view of parts of the output shaft gear box.

It is clear in FIG. 9 that output shaft gear box GH comprises of the gear box body G and the gear box cover plate H. The output shaft gear box body G has a transverse wall G1 in the front serving as rear end plate of the working chamber JK. The gear box body G is recessed in the rear to accommodate the small gear Y of the main shaft W and the gears Z1, Z2 of the auxiliary shafts Z, Z as well as the oil lubricating the gears and bearings inside the output shaft gear box GH.

Figure 10:
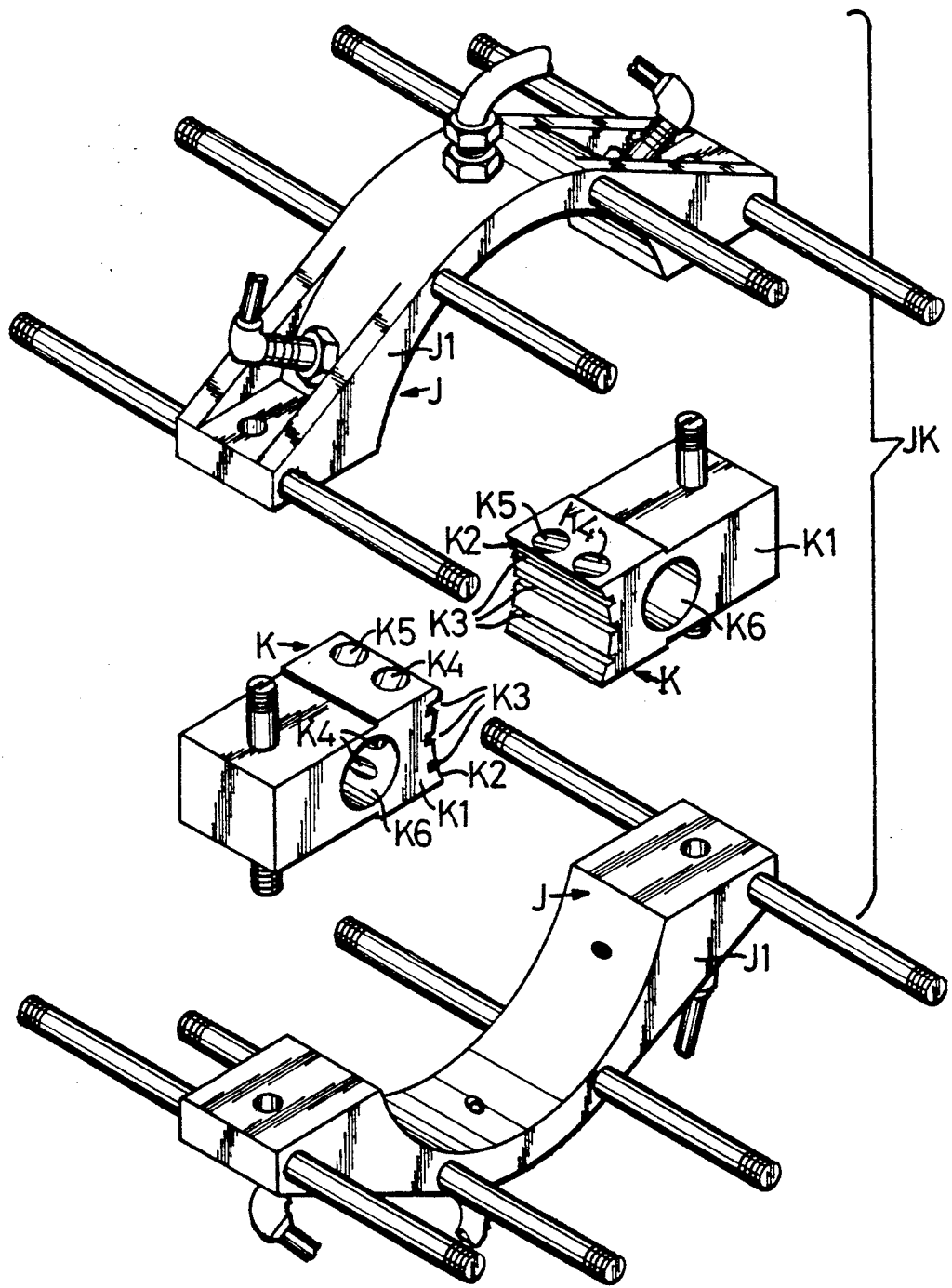
FIG. 10 is the exploded view of the working chamber excluding end plates which are parts of crank case and output shaft gear box.

FIG. 10 shows the basic parts of the working chamber JK excluding the front and rear end plates E1, G1 which are parts of the crank case EF and output shaft gear box GH, respectively. It consists basically of the two-piece shell J, J having a right circular cylindrical internal surface, and a pair of generally rectangular and diametrically opposing stator vanes K, K sandwiched and bolted between the shell halves J, J and projecting inwardly from said shell J, J.

At each side, front or rear, the radial edges J1, J1 of the shell halves J, J and the radial edges K1, K1 of the stator vanes K, K are on the same plane normal to the axis of the stator D.

The shell halves J, J and the stator vanes K, K have identical axial length substantially equal to the axial length of the rotor AB.

The concave axial edges K2, K2 of the stator vanes K, K are coaxial with the shell halves J, J and have identical radius of curvature substantially equal to the radius of the rotor cylinder A.

To promote sealing and minimize friction at rubbing contacts between the rotor cylinder A and the stator vanes K, K, the latter's concave axial edges K2, K2 have longitudinal grooves K3, K3, etc. running parallel to the axis of the stator D. During normal operation, the grooves K3, K3, etc. contain air and gas serving as seal and lubricant inside the working chamber JK.

Basic engine assembly

Figure 1:
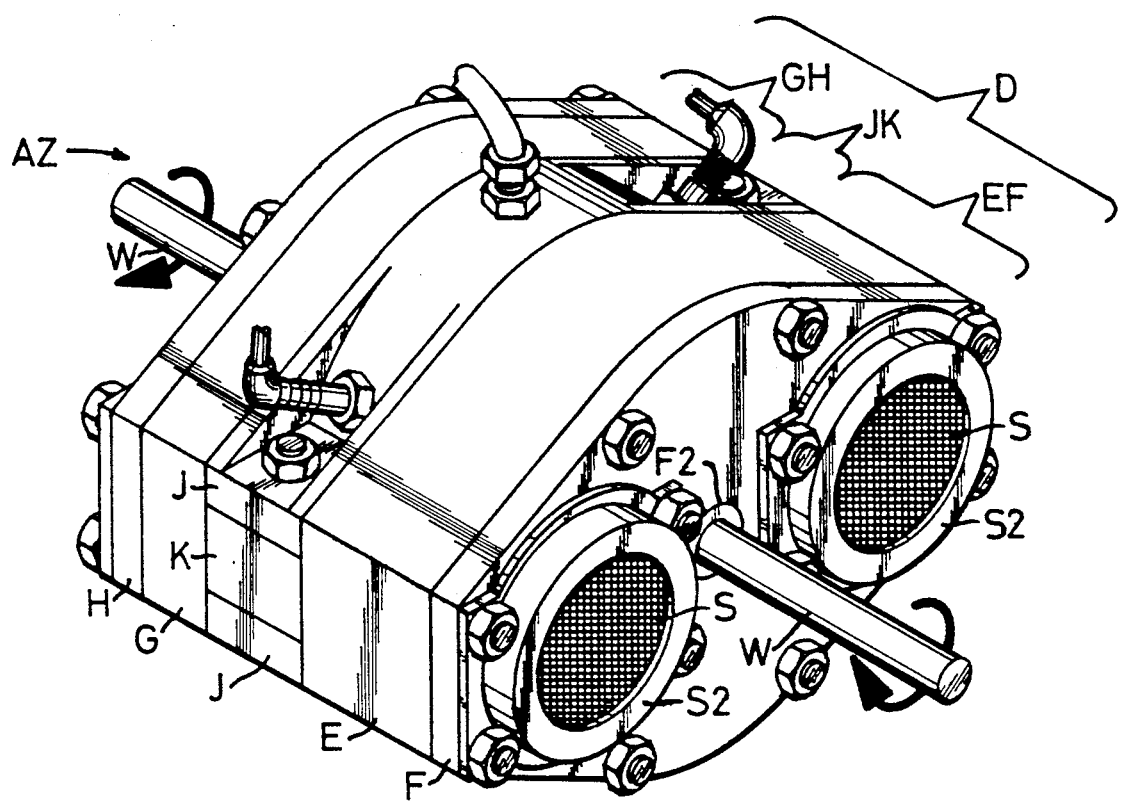
FIG. 1 is the isometric front view of the invention.
Figure 2:
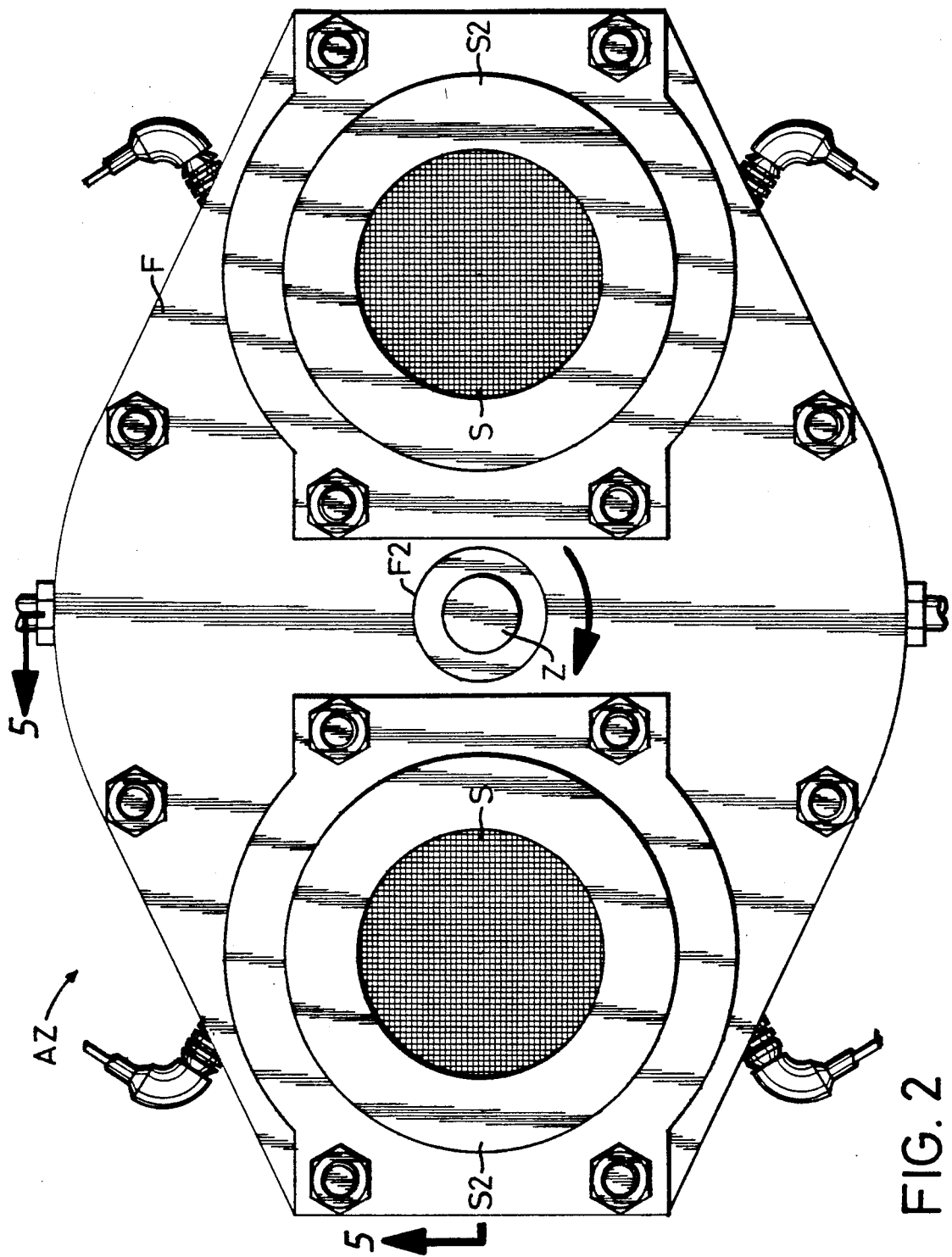
FIG. 2 is the orthographic front view of the invention.
Figure 3:
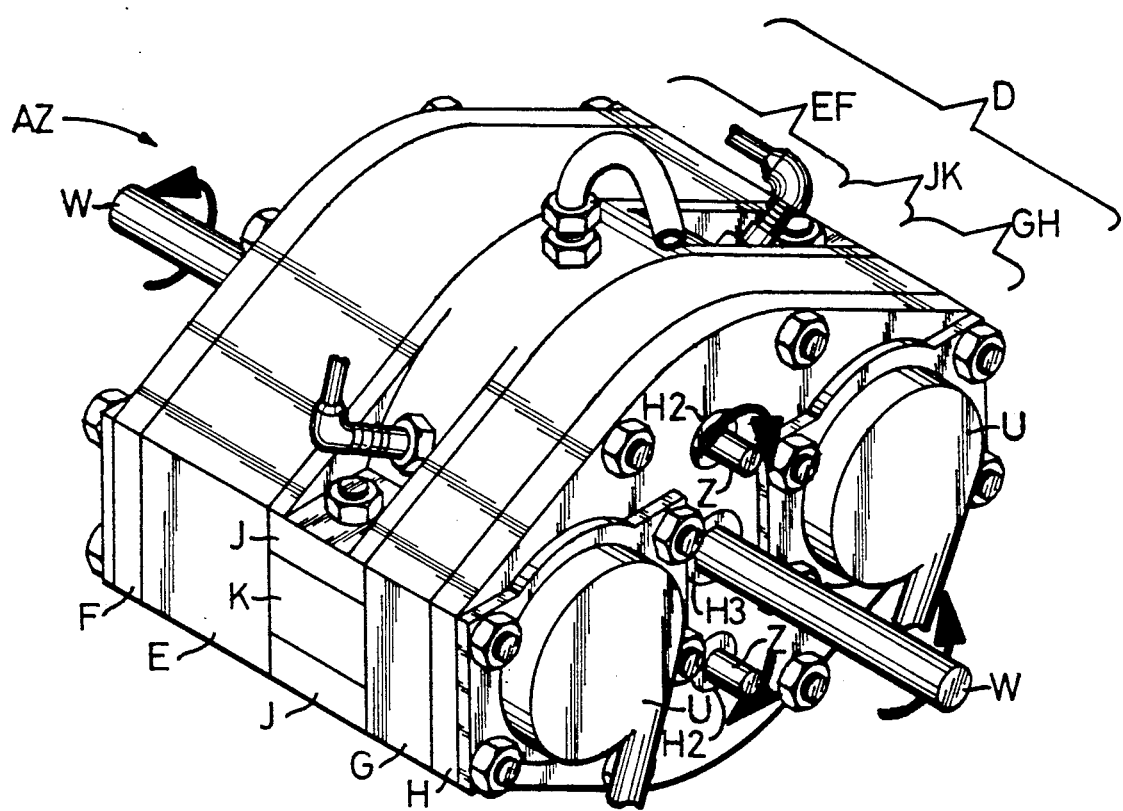
FIG. 3 is the isometric rear view of the invention.
Figure 4:
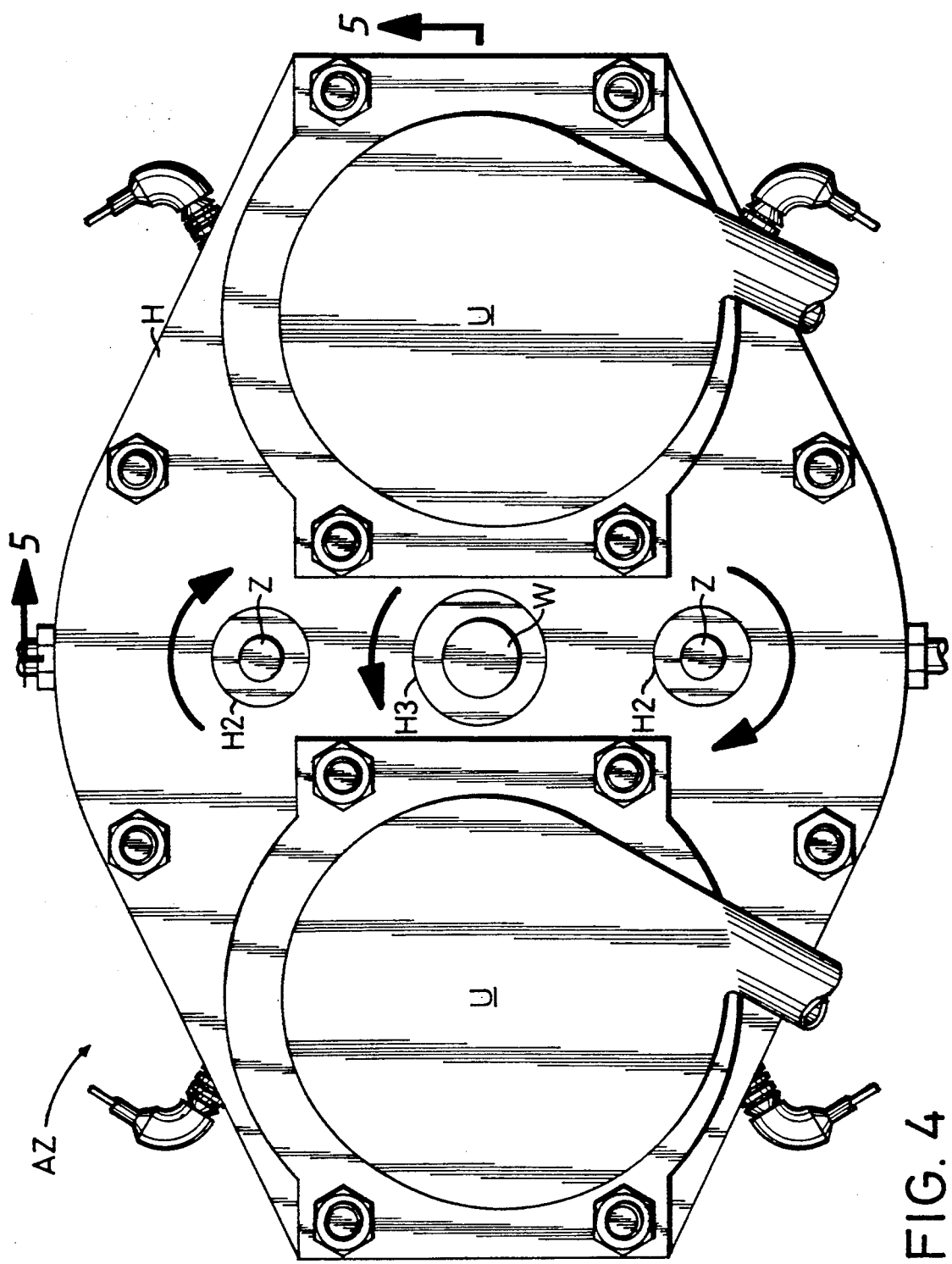
FIG. 4 is the orthographic rear view of the invention.
Figure 5:
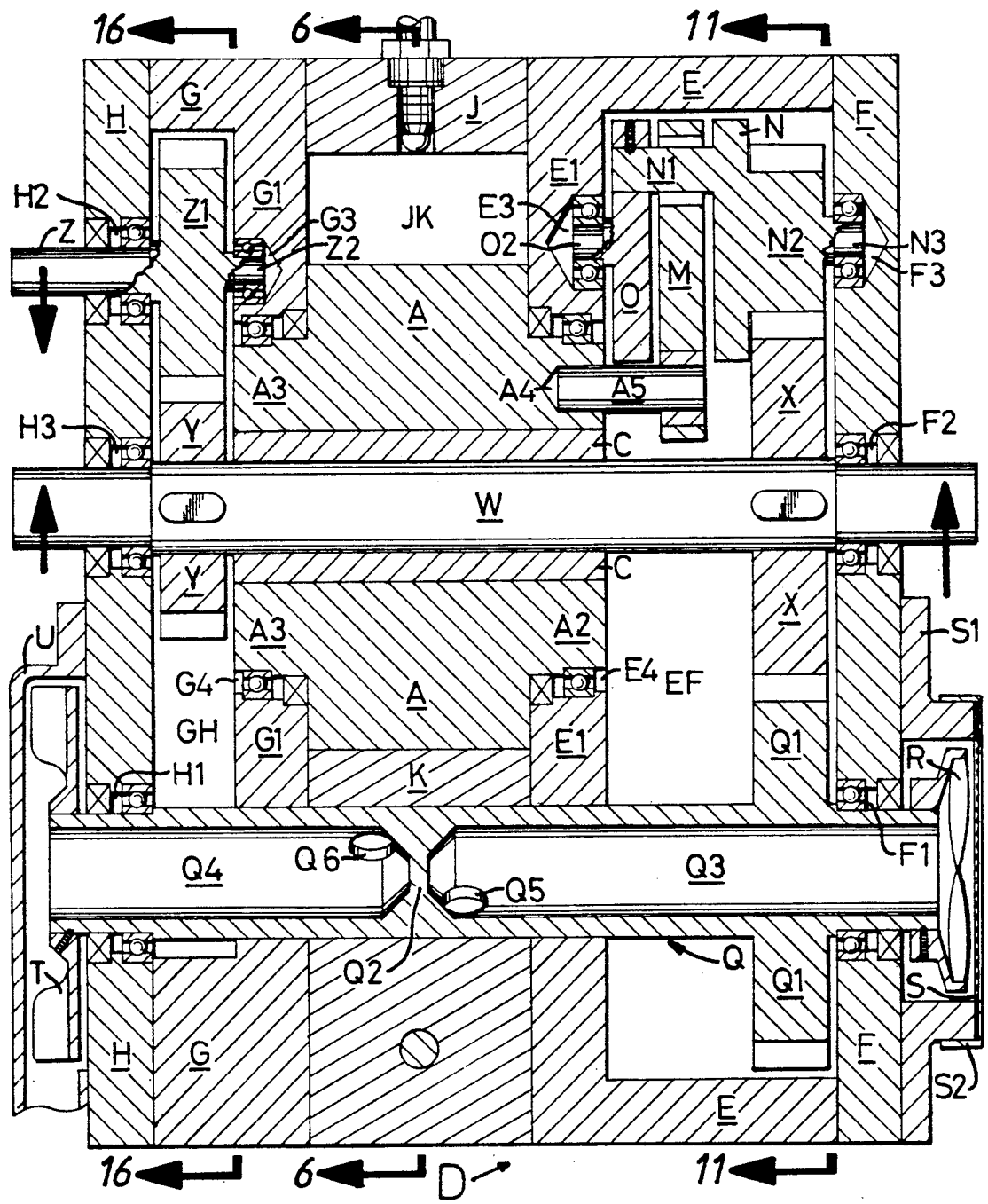
FIG. 5 is the longitudinal section of the invention along section line 5—5 of FIGS. 2, 4, 6, 11 and 16.

When the various parts of the stator D identified above and in FIGS. 8, 9 and 10, are assembled and bolted according to the disposition of the parts in FIG. 5, the crank case EF, output shaft gear box GH and working chamber JK are formed in the front, rear and middle, respectively.

The rotor AB is mounted inside the working chamber JK such that the rotor cylinder A is journalled for rotation between the concave axial edges K2, K2 of the stator vanes K, K; the convex axial edges B2, B2 of the rotor vanes B, B are journalled for rotation inside the right circular cylindrical hollow of the shell J, J; the radial edges A1, B1, B1 of the rotor cylinder A and rotor vanes B, B are in sealing sliding engagement with the internal surfaces of the transverse end plates E1, G1; and the rotor journals A2, A3 are journalled for axial rotation in the end plates E1, G1, through holes E4 and G4 with seals and bearings, respectively.

Annular cylindrical space of the engine

Figure 6:
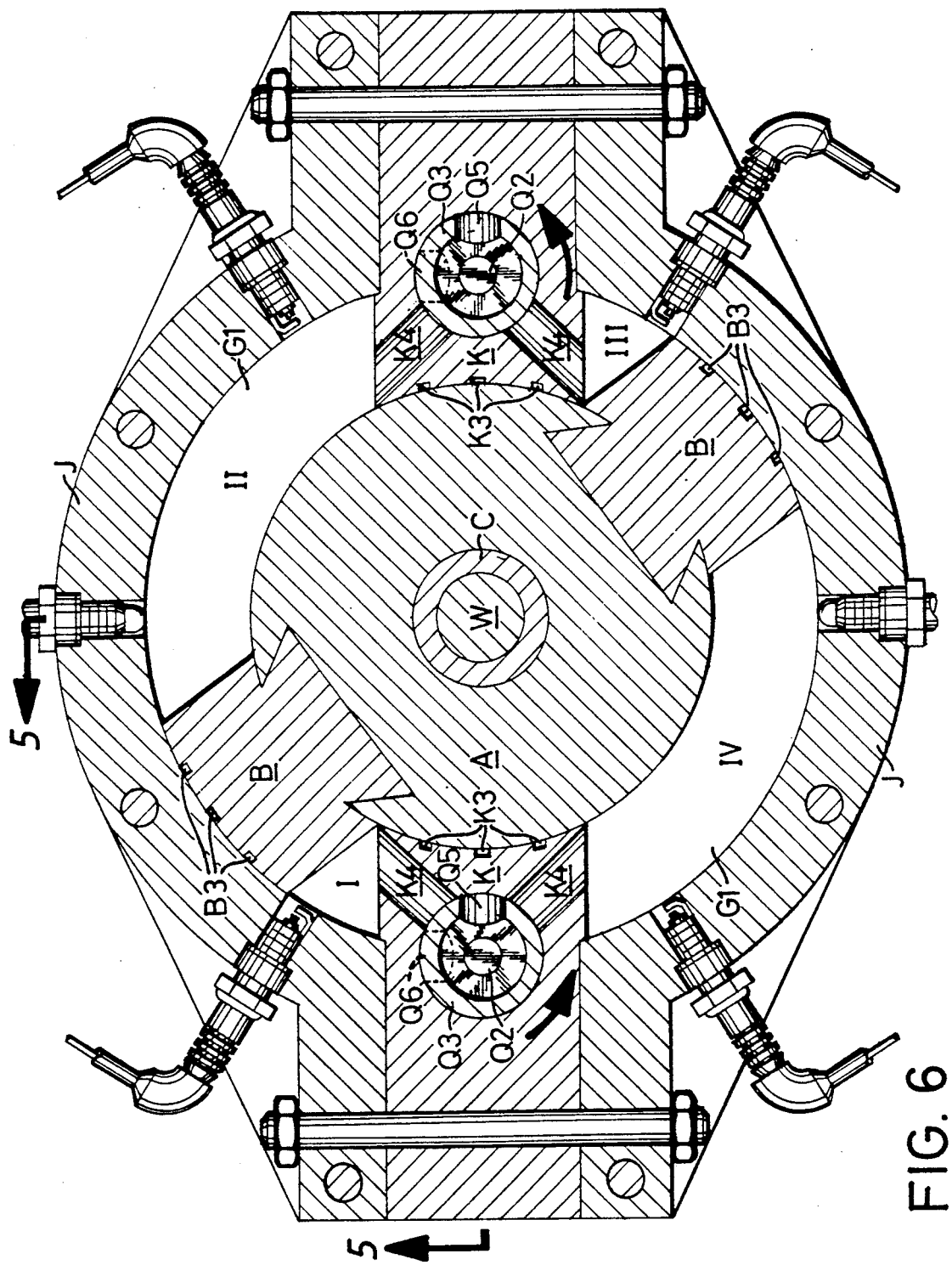
FIG. 6 is the transverse section of the invention along section line 6—6 of FIG. 5 showing the working chamber with the rotor.

Taking for granted the existence of the rotor vanes B, B and the stator vanes K, K in FIG. 6, there results an annular cylindrical space bounded by the rotor cylinder A, shell J, J and the two transverse end plates E1, G1. Viewed as an integral unit, the assembly corresponds to the cylinder block of the conventional piston-cylinder reciprocating internal combustion engine.

To seal this annular cylindrical space of the engine from the crank case EF and output shaft gear box GH, gas seals designed for high temperature and pressure applications are installed between the rotor journals A2, A3 and the transverse end plates E1, G1.

Working chambers

With the incorporation of the stator vanes K, K in the annular cylindrical interior of the engine AZ alluded above, two identical fixed volume arcuate working chambers are created.

To seal these pair of fixed volume working chambers from each other, the stator vanes K, K have longitudinal grooves K3, K3 on their concave axial edges K2, K2 contacting the rotor cylinder A. During normal operation, the grooves K3, K3, etc. contain hot air and gas offering resistance to passage of combustion media across the clearances between the stator vanes K, K and the rotor cylinder A.

Combustion Chambers

Adding the rotor vanes B, B, in the fixed volume combustion chambers forms the four varying volume arcuate combustion chambers I, II, III and IV. See FIG. 6.

To seal the combustion chambers I, II, III and IV from each other, the rotor vanes B, B have longitudinal grooves B3, B3 etc. on their convex axial edges B2, B2 contacting the right circular cylindrical internal surface of the shell J, J, and transverse grooves B4, B4 on their radial edges B1, B1 contacting the end plates E1 and G1. The grooves B3, B3, B4, B4, etc. contain hot gas offering resistance to passage of combustion media across clearances between the rotor vanes K, K and the shell J, J and the transverse end plates E1, G1. Sealing is considered effective because all four chambers are combustion chambers. The fuel and air escaping from one combustion chamber are benefitially used to perform the Otto cycle in the recipient combustion chamber.

Analog of the Piston-Cylinder Mechanism

Here is the analogous duplication of the piston-cylinder mechanism in the four stroke concentric oscillating rotary vane internal combustion engine AZ. The shell J, J, the rotor cylinder A, front transverse end plate E1 and rear transverse end plate G1 serve as the cylinder block while the annular cavity they bound functions as the cylinder. The stator vanes K, K dividing the annular cavity alluded above into two arcuate working chambers having fixed and identical volumes are analogous to the cylinder heads. Whereas, the rotary reciprocating rotor vanes B, B separating the four combustion chambers I, II, III and IV having variable volumes inside the working chamber JK correspond to the pistons.

Compression occurs when the rotor vane B approaches the stator vane K because the combustion chamber they enclose shrinks. Expansion happens when the rotor vane B moves away from the stator vane K because the combustion chamber that they enclose enlarges.

The smooth and effective operation of this analog of piston-cylinder mechanism in the invention is enhanced by the concentricity of the rotor AB and the stator D, uniform heat distribution, and hot gas and air in the grooves B3, B3, . . . , B4, B4, . . . , K3, K3, etc. of the rotor vanes B, B and stator vanes K, K.

Clearance small enough for minimal leakage of combustion media from one combustion chamber to another, and big enough for minimal friction between rubbing parts, can be easily adopted because the rotor AB and stator D are concentric and coaxial.

Since the invention is symmetrical vertically and horizontally, as well as all four variable volume working chambers I, II, III and IV are combustion chambers, heat is evenly distributed in the apparatus resulting in the absence of thermal distortion. This explains the stability of the parts, satisfactory sealing, low friction losses, and smooth oscillating rotation of the rotor AB inside the stator D.

The hot gas and air in the grooves B3, B4, K3, etc. of the rotor vanes B, B and stator vanes K, K work as piston rings and lubricant inside the working chamber JK. Aside from the sealing function elaborated earlier, the hot gas and air trapped in the grooves B3, B4, K3, etc. minimize friction and centralize the rotor AB inside the working chamber JK. The internal combustion process heats up the gas and air in the grooves B3, B4, K3, etc. that react by increasing their pressures and creating equal and opposing radial forces upon the rotor AB and stator D, ensuring equal clearances between rubbing parts during normal operation.

Proportional Dimensions

The invention is designed to operate optimally at a compression ratio of 9:1. Above this level, there are excessive leakage of combustion media and loss of compression. Below this level, there are low combustion efficiency and thermal efficiency. However, at 9:1 compression ratio, the invention performs at its peak efficiency.

To achieve 9:1 compression ratio, the thickness of the rotor vane B, thickness of stator vane K and half of the rotational stroke must be equal with each other as measured along the circumference of the internal surface of the shell J. Expressed in circular degrees about the axis, this dimension is 36 degrees or one tenth of the said circumference.

Cranking mechanism

The rotor AB is journalled for reciprocating rotation in the end plates E1, G1. This reciprocating rotation of the rotor AB inside the working chamber JK is controlled by two cranking mechanisms L, L.

Figure 12:
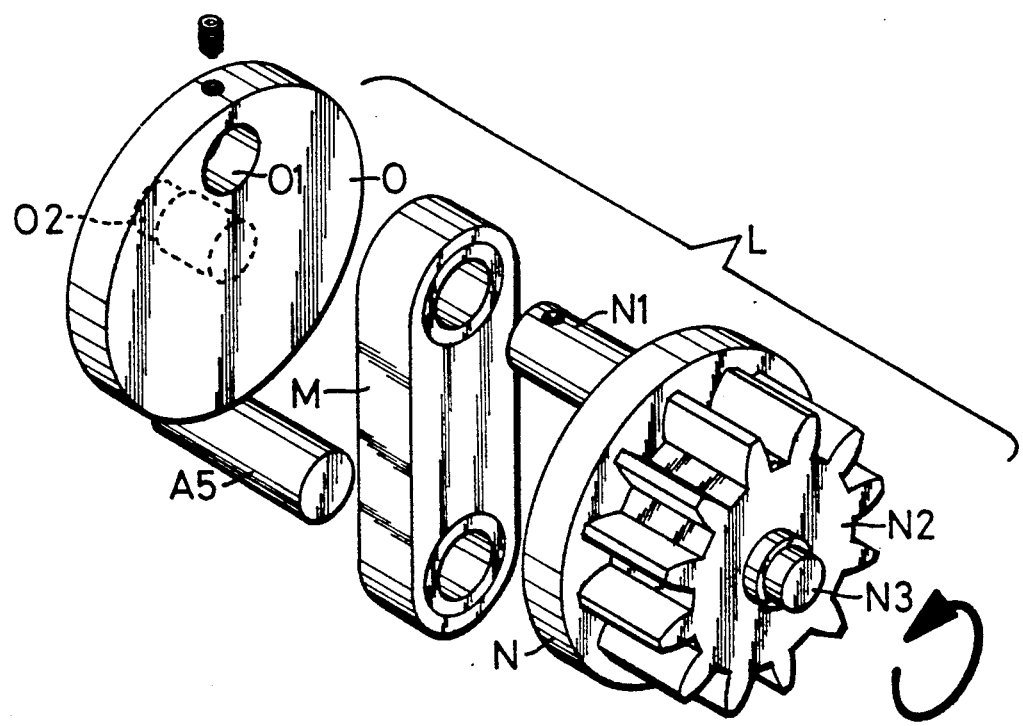
FIG. 12 is the exploded front view of the cranking mechanism.

Since the pair are identical, it is only necessary to discuss one cranking mechanism L which is pictured in FIG. 12. The rotor pin A5 is force fitted into the hole A4 on the transverse face of the front rotor journal A2 as shown in FIG. 7. The other end of the rotor pin A5 is journalled for rotation in one end of the connecting rod M, while in the other end of the latter is journalled the eccentric disc pin N1 which is rigidly connected to the transverse face of the first disc N. Said disc pin N1 is parallel to and at a distance D (expressed below) from the axis of the first disc N.

$D = d \sin S/2$, where d is distance of rotor pin A5 from axis of rotor AB and S is angular stroke of the rotor. Since S has been identified before as 36 degrees, it follows that $D = 0.309 d$.

To the other transverse face of the first disc N is rigidly connected the cranking gear N2, which is concentric with the former and has an axial journal N3 in the front for journalling in the crankcase cover plate F through hole F3 with bearing.

The rear end of the eccentric disc pin N1 is secured to the hole O1 in the transverse front face of the second disc O. From the transverse rear face of the second disc O projects its axial journal O2 journalled for axial rotation in the front end plate E1 through hole E3 with bearing. Since the first and second cylindrical cranking discs N, O have identical dimensions and coaxial with each other, they have the same transverse locations of the disc pin N1 connections and their axial journals N3, O2 are coaxial. Indeed they will rotate at the same time and speed.

The axes of the rotor AB, the cranking journals N3, N3, O2, O2, the cranking gears N2, N2 and the cranking discs N, N, O, O are on the vertical longitudinal plane bisecting the apparatus into symmetrical halves; whereas, the longitudinal plane bisecting the two rotor pins A5, A5 and passing through the axis of the rotor AB makes 70 degree angle from the longitudinal plane bisecting the rotor vanes B, B. This mensuration results to the rotary stroke of 36 degrees.

The simultaneous rotation of the cranking discs N, N, O, O causes the pulling and pushing of the rotor AB at their rotor pins A5, A5. This brings about the intermittent enlargement and shrinking of the combustion chambers I, II, III, IV.

Forced porting mechanism

It can be gleaned from FIG. 6 that opposite combustion chambers I, III or II, IV simultaneously increase or decrease in volumes, while the sum of volumes of adjacent combustion chambers I, II or II, III or III, IV, or IV, I is constant with respect to time or position of the rotor AB. The difference between adjacent combustion chambers I, II or II, III or III, IV or IV, I is one rotational stroke. It becomes clear that the combustion chambers I, II, III, IV can be made to perform the four stroke Otto internal combustion cycle in succession by one stroke increment if the porting of air into and exhaust gas out from the combustion chambers I, II, III, IV can be accomplished at the rate of one combustion chamber at a time and every stroke as well as if in each combustion chamber I or II or III or IV, the air porting can be made to lag by one stroke from exhaust porting.

These requirements are met by the forced porting mechanism P shown in FIGS. 5, 6, 11, 13 and 15. Air and exhaust gas are forcibly introduced into and removed from the combustion chambers I, II, III, IV, respectively, through the forced porting mechanism P and the air inlet ports K4, K4, etc. and exhaust outlets K5, K5, etc. in the stator vanes K, K.

Figure 11:
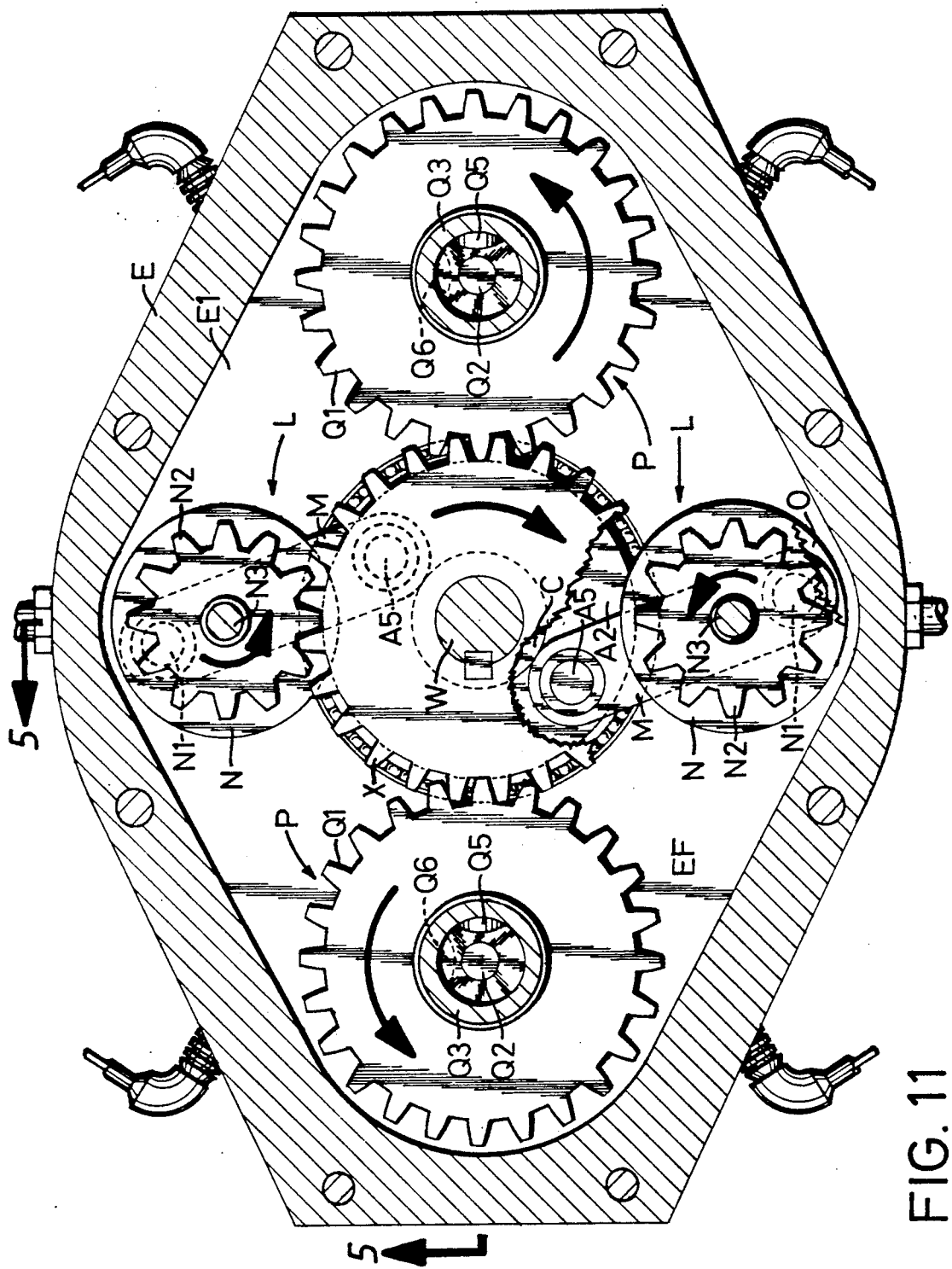
FIG. 11 is the transverse section of the invention along section line 11—11 of FIG. 5 showing the crank case with cranking and forced porting mechanisms as well as the main shaft and its big gear.

Since the two forced porting mechanisms P, P drawn in FIG. 11 are identical, it is only necessary to discuss one of them.

It is clear in FIG. 5 that the hollow cylindical tube Q passes through the stator D from end to end, and is journalled for axial rotation in the stator vane K, front end plate E1, rear end plate G1, crank case cover plate F and output shaft gear box cover plate H through holes K6, E2, G2, F1 and H1, respectively. Holes K6, E2 and G2 are by themselves bushes whereas, holes F1 and H1 have antifriction bearings for axial and radial support as well as oil seals for dynamic sealing. See also FIGS. 8, 9, 10, 15 and 16.

Figure 13:
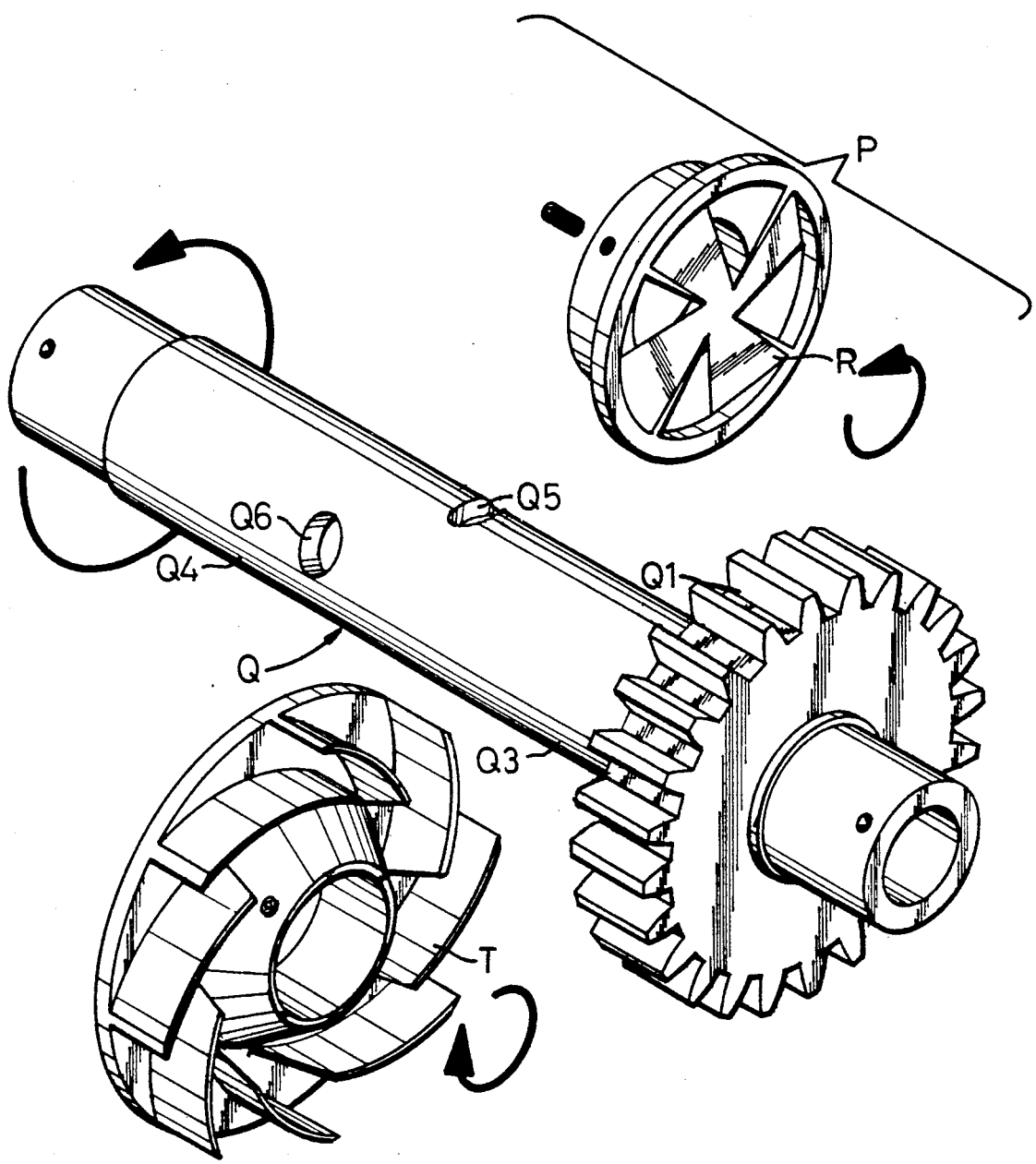
FIG. 13 is the exploded view of the forced porting mechanism.
Figure 14:
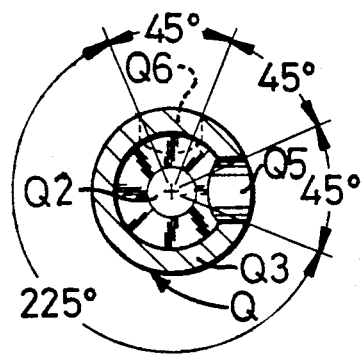
FIG. 14 is the transverse section of the forced porting mechanism at the air outlet.
Figure 15:
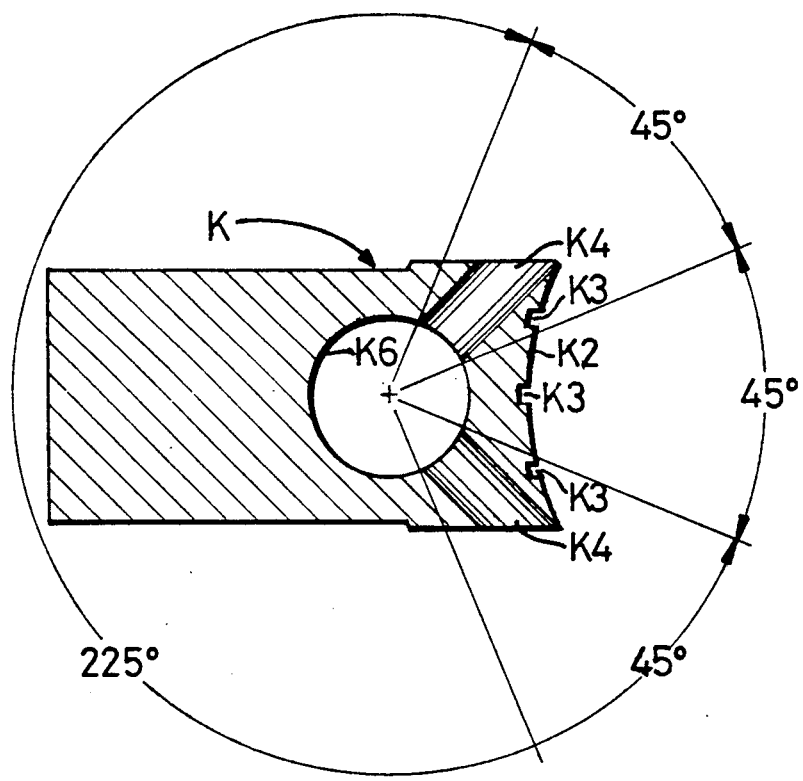
FIG. 15 is the transverse section of the stator blade.
Figure 16:
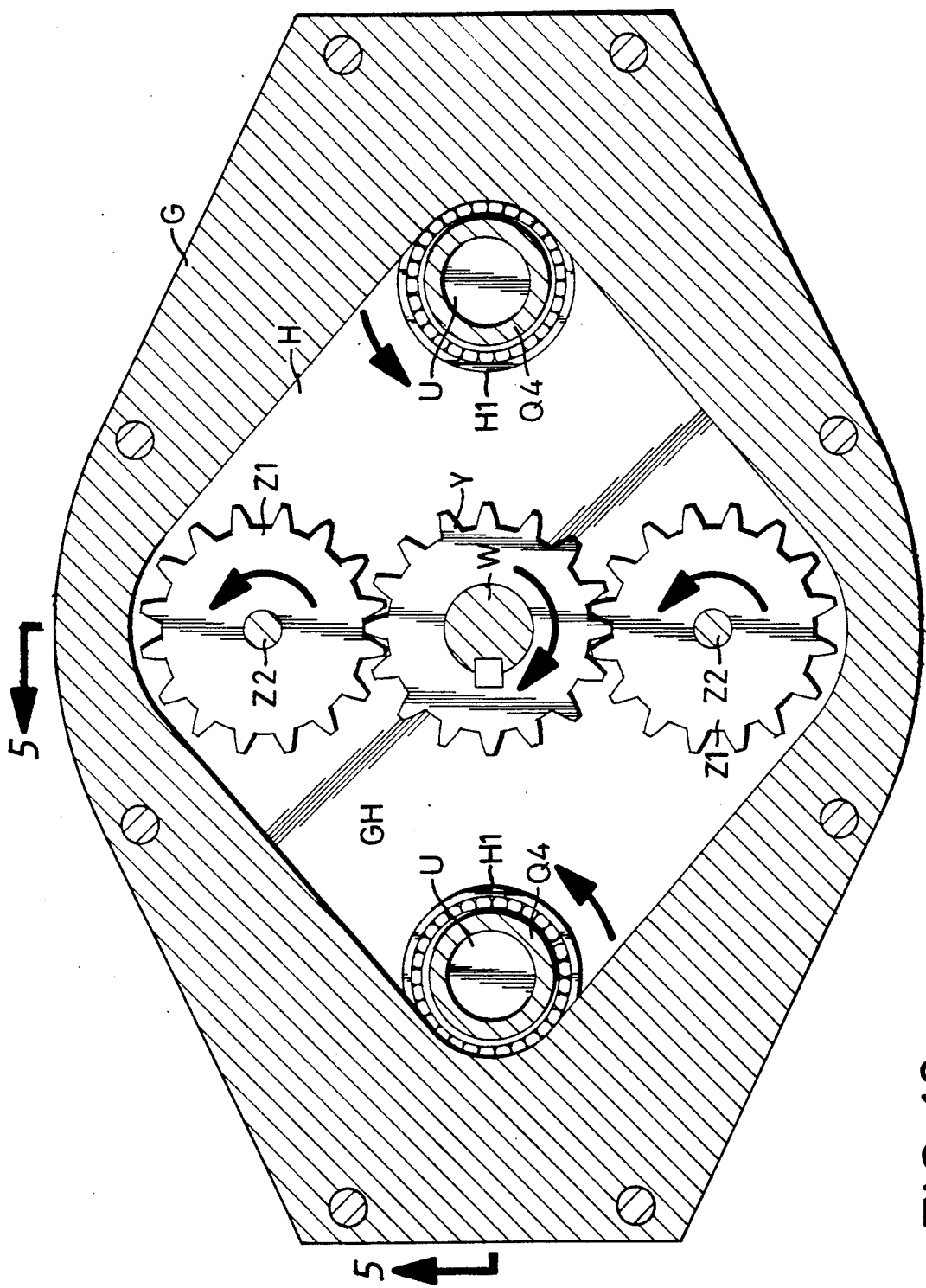
FIG. 16 is the transverse section of the invention along section line 16—16 of FIG. 5 showing the output shaft gear box with main and auxiliary shafts and their gears.

FIGS. 5, 11 and 13 show that a gear Q1 is an integral part of the tube Q in the crankcase EF where it is driven by the big gear X of the main shaft W to rotate at the rate of quarter rotation per stroke of the rotor AB. So, in one rotation of the tube Q, the combustion chambers I, II, III, IV accomplish two expansions and two contractions or one complete Otto cycle.

In the middle of the working chamber JK and in the interior of the tube Q is a transverse dividing wall Q2 separating the air duct Q3 in front from the exhaust duct Q4 in the rear. Beside this transverse wall Q2 inside the air duct Q3 is the air outlet Q5 measuring 45 degrees as reckoned in the outer circumference of the tube Q and having the same relative axial location as that of the air inlets K4, K4 of the stator vane K. On the other hand, beside the transverse wall Q2 inside the exhaust duct Q4 is the exhaust inlet Q6 measuring also 45 degrees as reckoned in the outer circumference of the tube Q and having the same relative axial locations as that of the exhaust inlets K5, K5 of the stator vane K. Assuming that the tube Q rotates counterclockwise, the air outlet Q5 lags behind the exhaust outlet Q6 by 90 degrees from axis to axis transversely, or by 45 degrees from edge to edge as reckoned on the outer circumference of the tube Q. Please see FIGS. 5, 6, 14, 18, 19, 20 and 21.

Each combustion chamber I or II or III or IV has one air inlet K4 and one exhaust outlet K5 having identical dimensions and diagonal orientation with respect to the bush K6 of the stator vane K. Consequently, the transverse section of the air inlets K4, K4 in FIG. 15 also applies to the exhaust outlets K5, K5 by simply substituting K5 for K4. The symmetrically located air inlets K4, K4 shown in FIG. 15 measuring 45 degrees as reckoned in the circumference of the bush K6 of the stator vane K, are 90 degrees apart from axis to axis or 45 degrees apart from edge to edge. The axis of each air inlet K4 is oriented diagonally from the center of the bush K6 towards the combustion chamber I or II or III or IV. The air inlets K4, K4 of the stator vane K have the same relative axial location as that of the air outlet Q5 of the air duct Q3.

The same dimension, transverse location and orientation described above for air inlets K4, K4 also apply to the exhaust outlets K5, K5 which have the same relative axial location as that of the exhaust inlet Q6 of the exhaust duct Q4.

For each combustion chamber I, II, III or IV, the air outlet Q5 of the air duct Q3 exactly corresponds in position with the air inlet K4 of the stator vane K in the middle of the air intake stroke, i.e., when the rotor vane B is midway between the two stator vanes K, K. They are about to intersect just after the exhaust stroke and just before the intake stroke. They have just finished the intersection immediately after the intake stroke and before the compression stroke. Studying FIGS. 18, 19, 20 and 21 will confirm these events.

For each combustion chamber I, II, III or IV, the exhaust inlet Q6 of the exhaust duct Q4 is in exact registration with the exhaust outlet K5 of the stator vane K in the middle of the exhaust stroke, i.e., when the rotor vane B is midway between the two stator vanes K, K. The exhaust inlet Q6 and exhaust outlet K5 are about to intersect just after the power stroke and just before the exhaust stroke. They have just finished the intersection immediately after the exhaust stroke and before intake stroke. These events will become clear after analyzing FIGS. 18, 19, 20 and 21.

An axial flow fan R is fixed at the front end of air duct Q3. The air filter S keeping incoming air clean is installed in front of the axial flow fan R by securing it in the flanged air filter holder S1 with the air filter gripper S2. The flanged air filter holder S1 bolted to the crankcase cover plate F encloses the axial flow fan R. The axial flow fan R is designed to take in fresh air from the atmosphere and to discharge it to the air duct Q3 at a flow rate per rotation greater than twice the displacement of a combustion chamber I, II, III or IV, to ensure more than sufficient supply of air for increased combustion efficiency and better control of air pollution.

On the other hand, a radial flow exhaust fan T is fixed at the rear end of the exhaust duct Q4. It is enclosed inside the exhaust fan casing U which is bolted to the output shaft gear box cover plate H and connected to the exhaust pipe of the vehicle. The radial flow exhaust fan T takes in exhaust gas from the exhaust duct Q4 and discharges it to the atmosphere through the exhaust pipe at a flow per rotation greater than twice the displacement of a combustion chamber I, II, III or IV, to ensure complete removal of exhaust gas from them before intake stroke for maximum air capacity of each combustion chamber I, II, III or IV, high combustion efficiency and elimination of carbon monoxide and unburnt fuel in the exhaust.

The two porting mechanisms P, P are synchronized to rotate once for every four strokes of the rotor AB or one complete Otto cycle of the combustion chambers I, II, III, IV. When properly set, the porting mechanisms P, P discharges air pressurized by the axial flow fans R, R, through their air outlets Q5, Q5 into the combustion chambers I, II, III, IV through their air inlets K4, K4, K4, K4 during their intake strokes occuring in the first, second, third and fourth strokes arbitrarily designated in FIGS. 18, 19, 20 and 21, respectively.

Three strokes after, the porting mechanisms P, P, with the assistance of the radial flow exhaust fans T, T draw in the by-products of combustion through their exhaust inlets Q6, Q6 from the combustion chambers II, III, IV, I through their exhaust outlets K5, K5 during their exhaust strokes occuring in the first, second, third and fourth strokes arbitrarily designated in FIGS. 18, 19, 20 and 21, respectively. See also FIG. 10.

During the compression and power strokes, neither the air portings nor the exhaust portings are open to keep the necessary pressures inside the combustion chambers I, II, III, IV.

Output shafts mechanism

Figure 17:
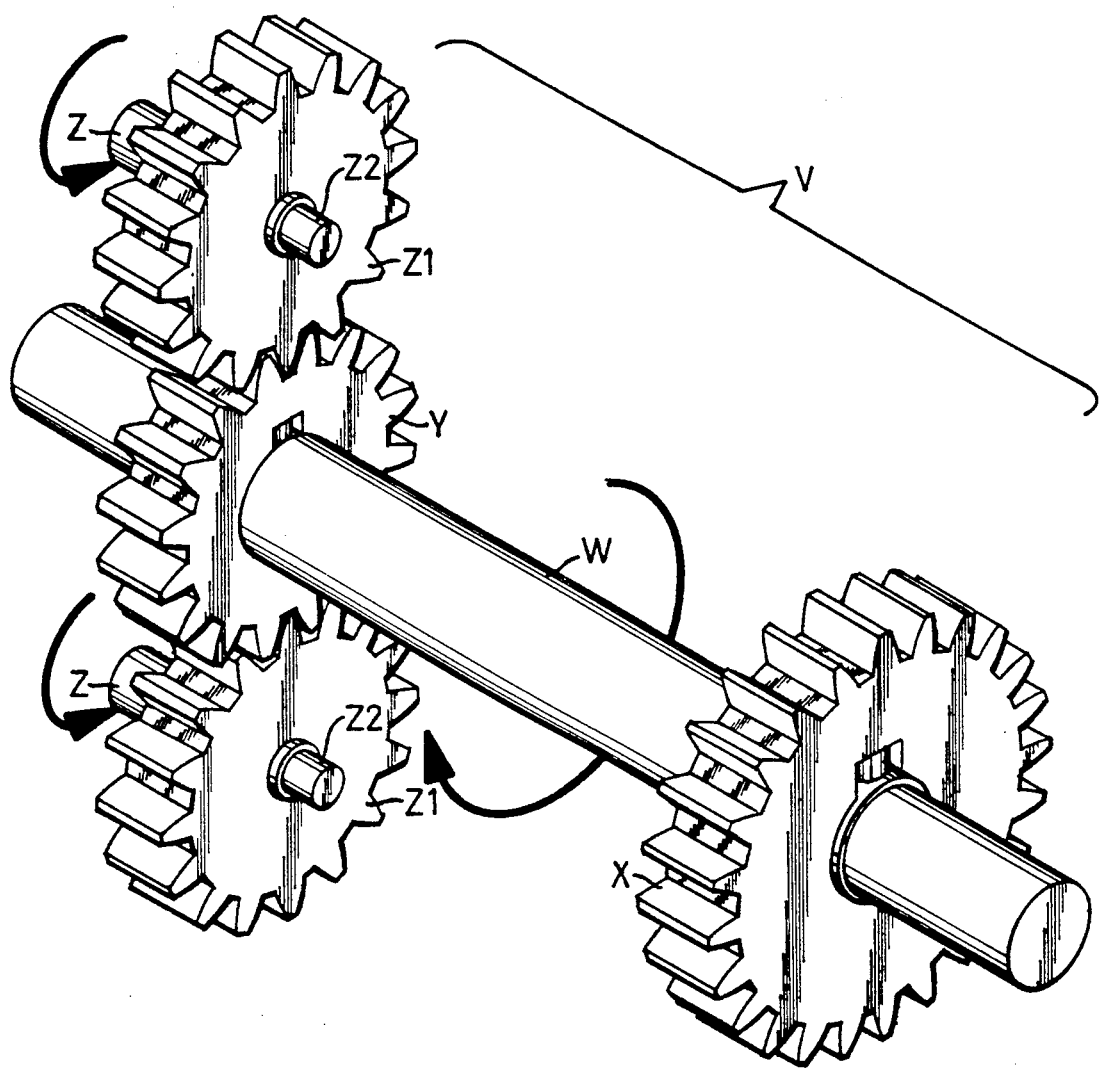
FIG. 17 is the isometric front view of the output shafts mechanism.

The output shafts mechanism V depicted in FIG. 17 orchestrates the synchronized and coordinated operations of the cranking mechanisms L, L, the forced porting mechanisms P, P, the fuel injection system and the spark ignition system. Moreover, it provides the brakepower output in front and rear of the engine AZ through its main shaft W.

It is clear in FIG. 17 that the output shafts mechanism V is made up of the main shaft W, the two auxiliary shafts Z, Z, their gears X, Y, Z1, Z1 and the auxiliary journals Z2, Z2.

FIG. 5 shows that the main shaft W is journalled for axial rotation in the rotor AB through sleeve bearing C fixed inside the central hole A6 of the rotor AB; in the crankcase cover plate F through hole F2 with bearing and oil seal; and in the gear box cover plate H through hole H3 also with bearing and oil seal.

FIG. 17 shows that each auxiliary shaft Z is integrally connected to the gear Z1 enmeshed with the small gear Y of the main shaft W within the gear box GH. See also FIGS. 5 and 16. The gear Z1 has a journal Z2 which is coaxial with both the gear Z1 and the auxiliary shaft Z. This assembly is journalled for axial rotation in the gear box cover plate H through hole H2 with bearing and oil seal; and in the rear end plate G1 through hole G3 with bearing.

The bearings minimize friction while the oil seals play important role in dynamic sealing.

As shown in FIGS. 5 and 11, in the crankcase EF, the big gear X of the main shaft W is enmeshed with the cranking gears N2, N2. Since their gear ratio is 2:1, the main shaft rotates once for every two rotations of the cranking gears N2, N2, four strokes of the rotor AB and one complete Otto cycle of the combustion chambers I, II, III, IV.

Referring to the same FIGS. 5 and 11, within the same crank case EF, the big gear X of the main shaft W is also enmeshed with the porting gears Q1, Q1. Since their gear ratio is 1:1, the above relationship also applies to the porting mechanism P, P, i.e., they rotate once for every four strokes of the rotor AB and one complete Otto cycle of the combustion chambers I, II, III, IV. Consequently, the porting mechanisms P, P induct air into the combustion chambers I, II, III, IV during their intake strokes and remove combustion byproducts from them during their exhaust strokes.

FIG. 17 shows that gears Z1, Z1 of the auxiliary shafts Z, Z are enmeshed with the small gear Y of the main shaft W inside the gear box GH. Since their gear ratio is 1:1, the above relationship also applies to the auxiliary shafts Z, Z running the fuel injector pump of the fuel injection system as well as the contact point and spark distributor of the spark ignition system. That is, the auxiliary shafts Z, Z rotate once for every four strokes of the rotor AB or one complete Otto cycle of the combustion chambers I, II, III, IV. Consequently, the spark ignition system causes the spark plugs to fire in the combustion chambers I, II, III, IV at the completion of their compression strokes and at the start of their power strokes; whereas, the fuel injection system effects the metered spraying of fuel into the combustion chambers I, II, III, IV during their intake strokes.

Fuel injection system

The invention utilizes the conventional tubing connections, fuel tank, fuel filter, fuel injector nozzles and fuel injector pump of a four cylinder diesel engine.

The fuel injector pump has four outlets discharging at the same flow rates one at a time during one rotation of its shaft. It is driven by one of the two auxiliary shafts Z which is synchronized to rotate once for every four strokes of the rotor AB and one complete Otto cycle of the combustion chambers I, II, III, IV. Consequently, when properly calibrated, the fuel injector pump can inject the right amount of fuel to all combustion chambers I, II, III, IV during their intake strokes. Only two fuel injector nozzles are used installed on the top and the bottom of the shell J, J midway between the stator vanes K, K. The top fuel injector nozzle is connected in parallel to the first and second outlets of the fuel injector pump while the bottom fuel injector nozzle is connected in parallel to the third and fourth outlets of the same pump. The pump outlets are designated in the order of the sequence of injecting fuel.

Figure 18:
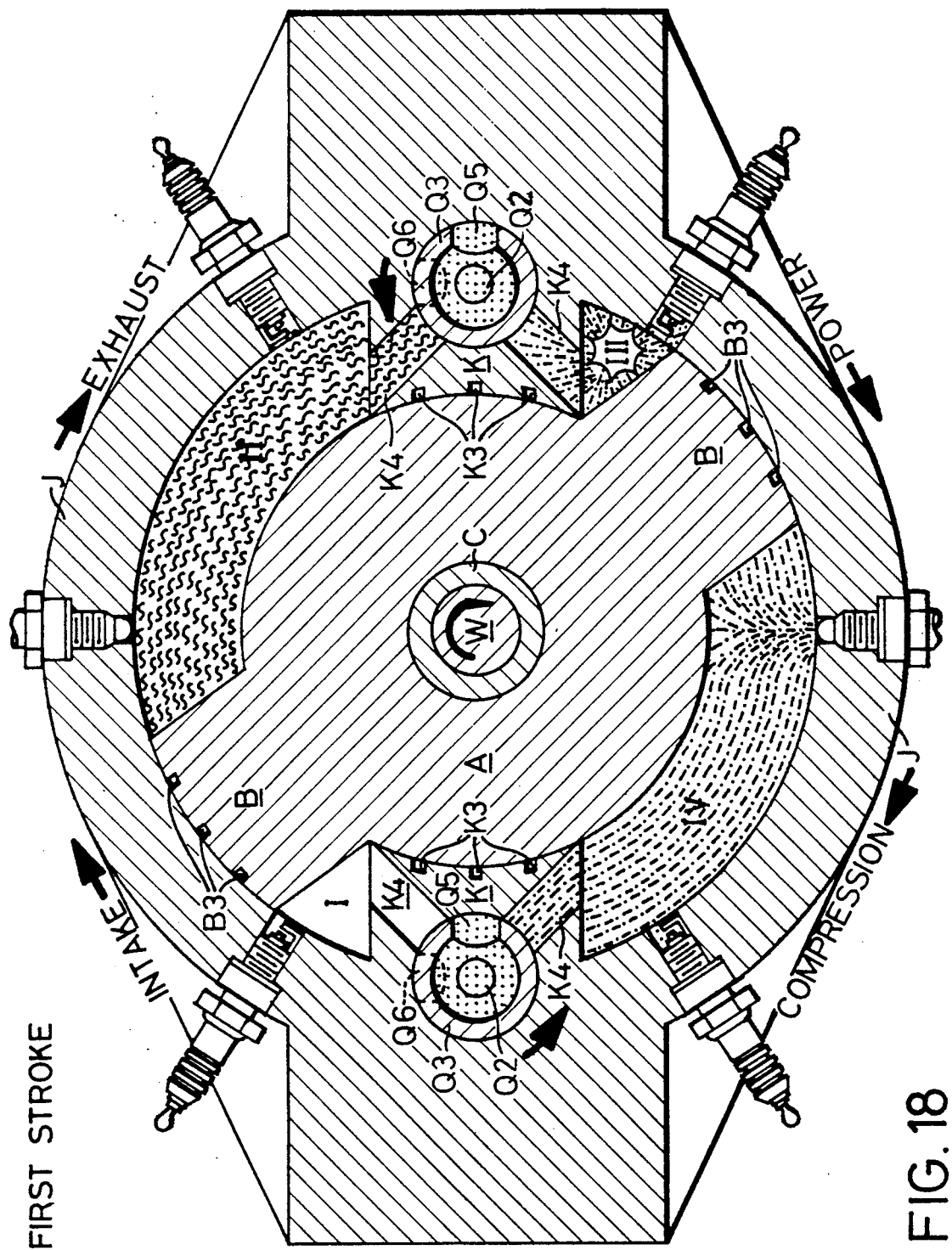
FIG. 18 is the transverse section of working chamber at the end of fourth stroke and start of first stroke.
Figure 19:
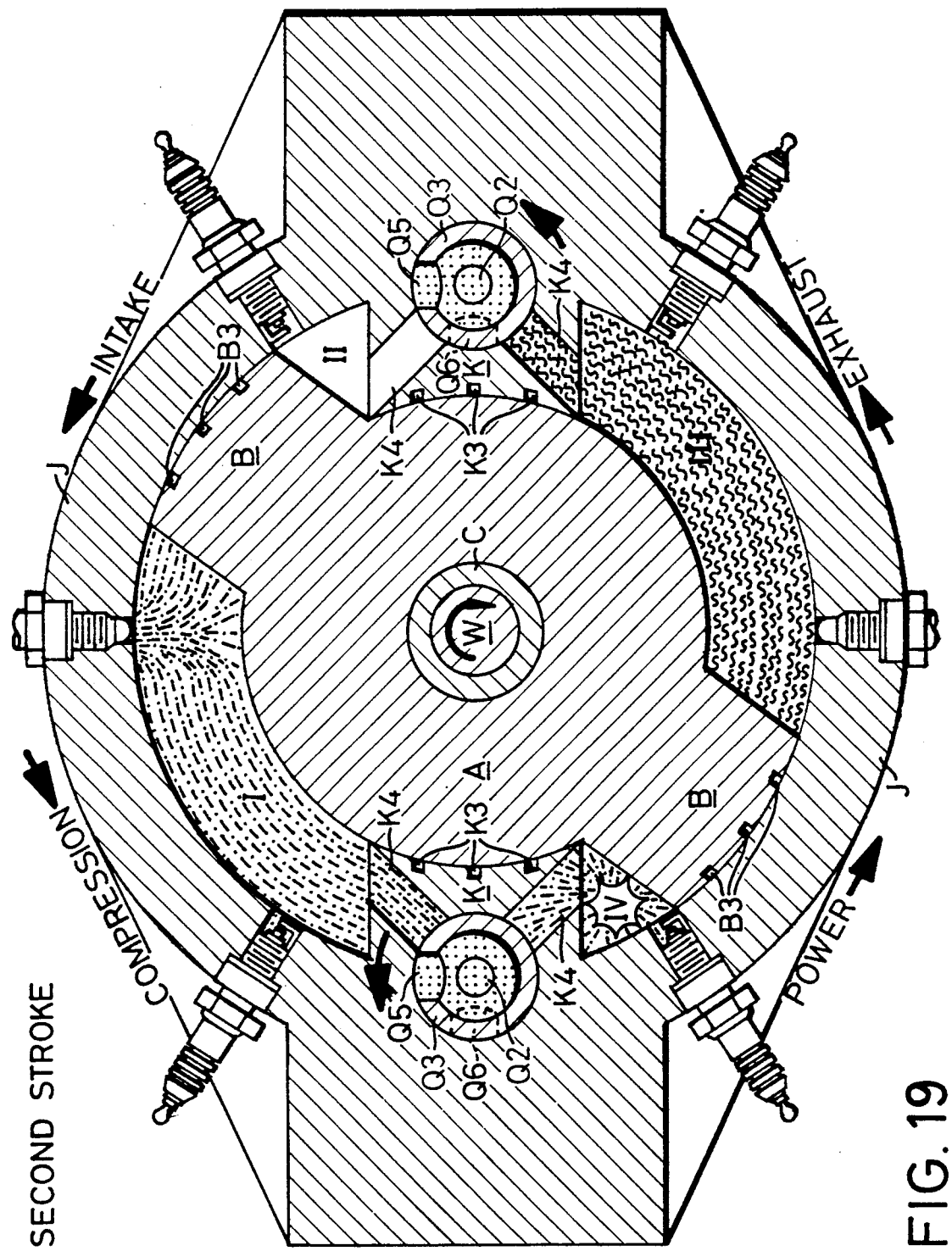
FIG. 19 is the transverse section of working chamber at the end of first stroke and start of second stroke.
Figure 20:
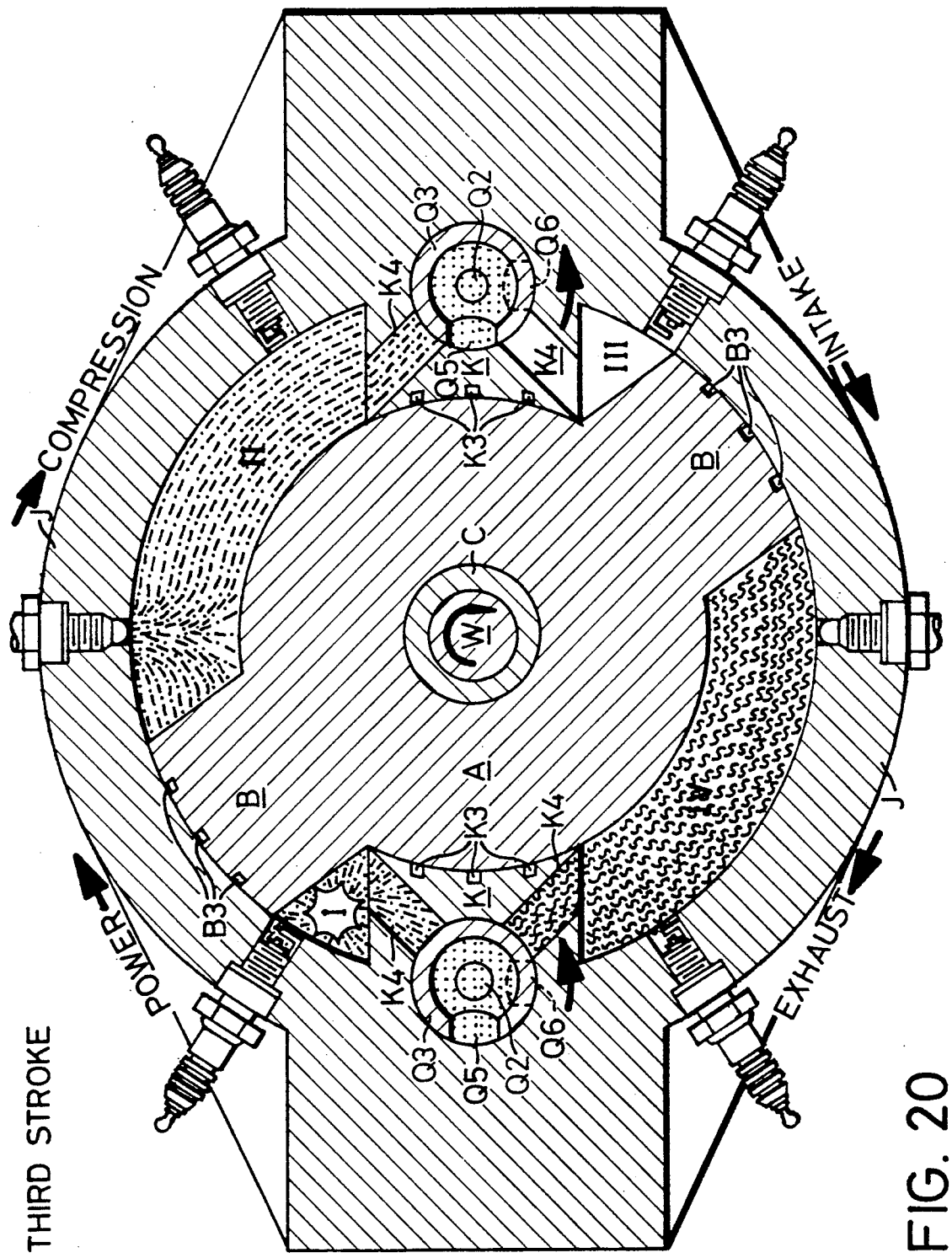
FIG. 20 is the transverse section of working chamber at the end of second stroke and start of third stroke.
Figure 21:
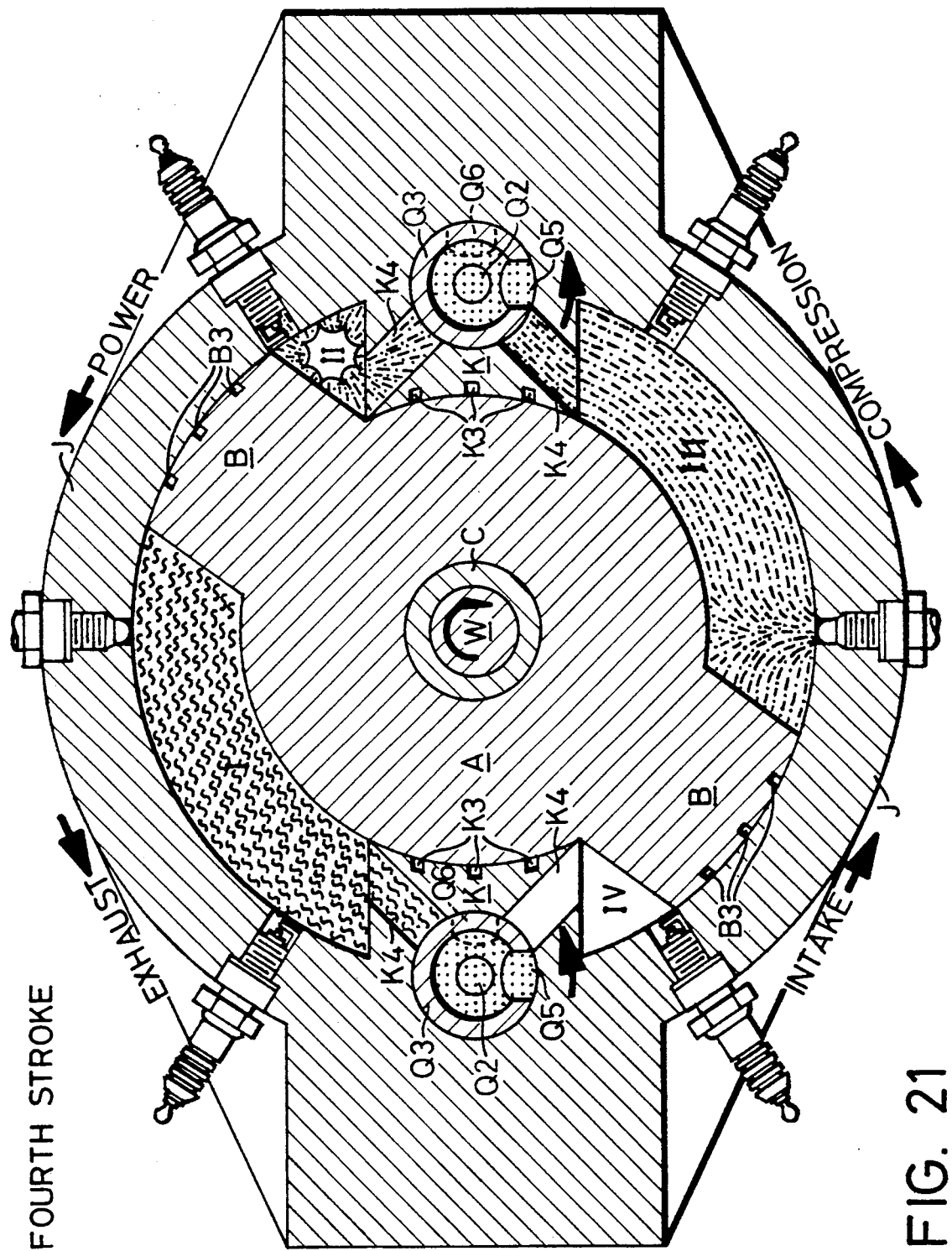
FIG. 21 is the transverse section of working chamber at the end of third stroke and start of fourth stroke.
Figure 22:
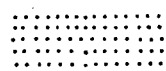
FIG. 22 is the legend of symbols of widely known parts which are not designated in the drawings.
Figure 22:
Figure 22:
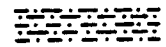
Figure 22:
Figure 22:
Figure 22:
Figure 22:
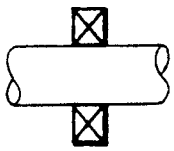
Figure 22:
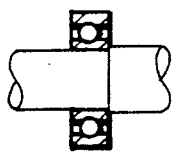
Figure 22:
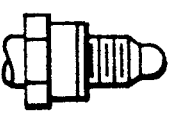
Figure 22:
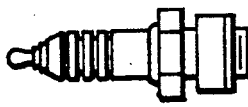
Figure 22:
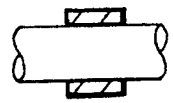
Figure 22:
Figure 22:
Figure 22:

As a result, fuel is metered out by the first and second pump outlets through the top fuel injector nozzle into the combustion chambers I, II during the first and second strokes arbitrarily designated in FIGS. 18 and 19, in which air is intaken by combustion chambers I, II, respectively; whereas, fuel is metered out by the third and fourth pump outlets through the bottom fuel injector nozzle into combustion chambers III, IV during the third and fourth strokes (FIGS. 20 and 21) in which air is intaken by combustion chambers III, IV, respectively.

Spark ignition system

The invention utilizes the conventional cable connections, wet cell battery, ignition coil, contact point, condenser, spark plugs and spark distributor of a four cylinder gasoline engine.

The contact point and spark distributor are operated by one of the two auxilliary shafts Z which is synchronized to rotate once for every four strokes of the rotor AB and one complete Otto cycle of the combustion chambers I, II, III, IV. Consequently, when properly set, the spark ignition system can cause the spark plugs to fire in combustion chambers I, II, III, IV at the end of their compression strokes and at the start of their power strokes. Each spark plug is installed near the stator vane K because it sparks when the stator vane K and rotor vane B are nearest each other.

The spark plugs in the combustion chambers I, II, III, IV are connected to third, fourth, first and second outgoing leads in the spark distributor, designated in the same order of the sequence of firing. As a result, the spark plugs fire and ignite explosions in combustion chambers III, IV, I and II during the first, second, third and fourth strokes arbitrarily designated in FIGS. 18, 19, 20 and 21, in which power is generated in the combustion chambers III, IV, I, II, respectively.

Speed control

A governor regulating the flow of fuel into the combustion chambers controls the speed of the engine. Big fuel flow rate results to fast speed of the engine and vice versa.

Operation

The four stroke concentric oscillating rotary vane internal combustion engine operates in accordance with five operating stages of the four stroke Otto cycle, namely, air intake and fuel injection, compression, explosion, expansion and exhaust. The cranking mechanisms, porting mechanisms, fuel injection system and spark ignition system are synchronized and coordinated by the output shafts mechanism to allow the four combustion chambers to continuously perform the four stroke Otto cycle, with all four strokes, namely, intake, compression, power and exhaust, simultaneously occuring in the four combustion chambers. This results to one power stroke occuring every rotational stroke of the rotor AB.

The thermodynamic events inside the four combustion chambers I, II, III, IV in FIGS. 18, 19, 20 and 21, as the rotor AB rotates intermittently in clockwise and anti-clockwise directions, are analyzed and explained.

First stage

Isobaric air intake and fuel injection

During the duration of the intake stroke (first, second, third and fourth strokes for combustion chambers I, II, III and IV, respectively, as shown in FIGS. 18, 19, 20 and 21), the air portion is open, i.e., the air outlet Q5 of the air duct Q3 and the air inlet K4 of the stator vane K intersect with each other alowing entrance of slightly pressurized air from the air duct Q3. Since the air duct Q3 is fitted with an axial flow fan R drawing air from the atmosphere at the rate per rotation of more than twice the displacement of the combustion chamber, the pressure of air rushing into the combustion chamber I, II, III or IV is slightly higher than atmospheric. Consequently, the positive displacement performed by the combustion chamber effecting suction is reinforced by the forced porting mechanism P increasing the air intake.

The fuel injection system is programmed to spray and atomize metered fuel through the fuel injector nozzle during the intake stroke when it is exposed by the rotor vane B. The fresh air warmed up by convection vaporizes the fuel mixing with it. The vaporization has a cooling effect promoting dense fuel-air mixture.

Second Stage

Polytropic compression

During the duration of the compression stroke (second, third, fourth and first strokes for combustion chambers I, II, III and IV, respectively, as shown in FIGS. 19, 20, 21 and 18), both air and exhaust portings are closed, i.e., the air outlet Q5 of the air duct Q3 and the air inlet K4 of the stator vane K as well as the exhaust inlet Q6 of the exhaust duct Q4 and the exhaust outlet K5 of the stator vane K do not intersect with each other preventing the escape of the fuel-air mixture.

During the compression stroke, i.e., when the rotor vane B compresses the combustion chamber from its maximum volume to minimum volume, the fuel and air thoroughly combine into an explosive mixture, this mixture increases in entropy by heat addition by convection from hot parts of the engine, and both pressure and temperature of the fuel-air mixture escalate.

Compression of combustion media spends mechanical power which must be sustained by the expansion stage.

Third stage

Isochoric explosion

The rotor vane B after decelerating, comes to a halt upon achievement of minimum volume of combustion chamber I, II, III or IV which is about 1/9 of its volume during the start of compression. At this instance, spark ignition system causes the spark plug to fire igniting the explosion of compressed fuel-air mixture. This instantaneous event is caught in action in FIGS. 20, 21, 18 and 19 for combustion chambers I, II, III and IV, respectively.

The explosion of the fuel-air mixture happens at constant volume because the mixing of fuel and air has been thoroughly accomplished during the intake and compression strokes, spark is present and the rotor vane B is at rest after decelerating and just before accelerating backward. For this reason, both pressure and temperature instantly go up to very high levels.

Fourth stage

Isentropic expansion

During the duration of the power stroke (third, fourth, first and second strokes for combustion chambers I, II, III and IV, respectively as shown in FIGS. 20, 21, 18 and 19) both air and exhaust portings are closed, i.e., the air outlet Q5 of the air duct Q3 and the air inlet K4 of the stator vane K as well as the exhaust inlet Q6 of the exhaust duct Q4 and the exhaust outlet K5 of the stator vane K do not intersect with each other preventing the escape of the high pressure and hot gases from the combustion chamber.

During the power stroke, i.e. when the rotor vane B stops and changes direction of rotation and accelerates away from the stator vane K, pressure differential across the rotor vane B imparts the rotor AB with torsional moment producing mechanical power. The continuous expansion of the hot gas does not involve loss of entropy, hence both pressure and temperature decrease.

By the end of the power stroke, the exhaust porting is impending to open in preparation for the fifth stage.

Fifth stage

Exhaust at diminishing pressure

During the duration of the exhaust stroke (fourth, first, second and third strokes for combustion chambers I, II, III and IV, respectively, as shown in FIGS. 21, 18, 19 and 20), the exhaust porting is open, i.e., the exhaust inlet Q6 of the exhaust duct Q4 and the exhaust outlet K5 of the stator vane K intersect with each other allowing exit of the by products of combustion from the combustion chamber to the atmosphere via the exhaust duct Q4 and exhaust pipe of the vehicle. Since the exhaust duct Q4 is fitted with a radial flow exhaust fan T drawing exhaust from the combustion chamber and discharging it to the atmosphere through the exhaust pipe at the rate per rotation of more than twice the displacement of the combustion chamber, the pressure of exhaust gases inside the combustion chamber I, II, III or IV decreases from slightly higher than atmospheric at the start of the exhaust stroke to slightly lower than atmospheric at the end of the exhaust stroke. Consequently, the positive displacement performed by the combustion chamber effecting discharge is reinforced by the forced porting mechanism P to rid the combustion chamber of the byproducts of combustion.

At the end of the exhaust stage, exhaust porting is closed while air porting is impending to open. The empty combustion chamber is therefore ready for the next Otto cycle.

Conclusion

Clearly, the objects of the invention are achieved in the non-polluting, highly efficient and cheap four stroke concentric rotary vane reciprocating internal combustion engine.

It is non-polluting because of complete combustion of fuel by air. The forced porting mechanisms thoroughly remove the by-products of combustion during the exhaust stroke and supply more than sufficient air during the intake stroke. Its relatively long stroke allows ample time for air to combine with and oxidize the fuel injected into the combustion chamber. And the lubricating oil does not interfere in the combustion process.

It is highly efficient because of less friction and high thermal and combustion efficiencies.

Less power is lost to friction because of four reasons. First is that the cranking mechanisms, gears and bearings are in oil bath and sealed from the combustion chambers and the atmosphere. Second, the piston rings and oil are replaced by hot air and gas serving as effective seal and lubricant in the grooves of rubbing parts. Third, constant working clearance is maintained between rubbing parts because of concentricity of the rotor and stator. And fourth, there is no thermal distortion of parts since all four variable volume chambers are combustion chambers, the apparatus is transversely symmetrical horizontally and vertically, and there is uniform heat distribution in the apparatus in general.

The high thermal and combustion efficiencies of the four stroke rotary vane reciprocating internal combustion engine are attributed to the following factors. Complete combustion of fuel by air illucidated above contributes in achieving high combustion efficiency. Less heat of combustion is lost because there is no radiator which ordinarily wastes about one third ($\frac{1}{3}$) of the heat of combustion. d radiator is not required in the invention because there are no springs to protect from relaxating and setting and valves to prevent from expanding and breaking the cylinder head. The engine's optimum compression ratio of 9:1 favors high thermal efficiency. Moreover, the hot air and gas in grooves of rubbing parts and the conventional seals between rotating and stationary parts provide effective dynamic sealing of the combustion chambers.

Its first, maintenace, operation and repair costs are cheap. Its first cost cannot be expensive because it has few and simple parts that are easy to manufacture and assemble. It is also cheap to maintain and operate. Since the lubricating oil is sealed inside the crankcase and gear box and is not oxidized, there are no oil and oil filters to periodically replace. Its high thermal and combustion efficiencies result to low fuel consumption rate. Further, repair cost is likewise cheap because its parts are few, simple and sturdy.

What is claimed as new is:

1. A four stroke concentric oscillating rotary vane internal combustion engine made up of a pair of cranking mechanisms, a pair of forced porting mechanisms, an output shaft mechanism, a stator, a rotor, four arcuate combustion chambers and longitudinal and transverse grooves for lubrication and dynamic sealing, in which:
   a. said pair of cranking mechanisms control the oscillating rotary motion of the rotor, each cranking mechanism comprising:
      i. a pair of parallel and coaxial cylindrical discs,
      ii. an eccentric pin connecting rigidly said pair of discs with each other,
      iii. a gear coaxially and integrally connected to the front disc, iv. a pair of axially opposed journals coaxially and outwardly projecting from the rear disc and said gear, and v. a connecting rod pivotally connected to said disc pin at one end;

b. said pair of forced porting mechanisms control the forced porting of air into and combustion byproducts from the combustion chambers, each forced porting mechanism comprising:

i. a hollow tube divided by a transverse wall into an air duct in front and an exhaust duct in the rear, ii. an exhaust inlet adjacent said transverse dividing wall and in said exhaust duct measuring 45 degrees from edge to edge of the inlet on the outer circumference of said exhaust duct, iii. an air outlet adjacent said transverse dividing wall and in said air duct measuring 45 degrees from edge to edge of the outlet and lagging behind by 45 degrees in the direction of rotation of the hollow tube from said exhaust inlet from edge to edge as reckoned on the outer circumference of said air duct, iv. a gear integrally connected with said hollow tube, v. an axial flow fan connected to the front end of the air duct and supplying slightly pressurized air into the combustion chambers, and vi. a radial flow exhaust fan connected to the rear end of said exhaust duct and extracting combustion byproducts from the combustion chambers;

c. said output shaft mechanism orchestrating and coordinating the synchronized iterative operations of said cranking mechanisms, said forced porting mechanisms, a fuel injection system and a spark ignition system, comprising:

i. a main shaft providing brake power output in the front and rear of the engine, ii. a big gear keyed to said main shaft and enmeshed with said cranking gears and porting gears at gear ratios of 2:1 and 1:1, respectively, iii. a pair of auxilliary shafts driving the fuel injection and spark ignition systems, iv. a pair of gears coaxially and integrally connected to said auxilliary shafts, v. a pair of journals coaxially projecting from said gears of the auxilliary shafts, and vi. a small gear keyed to said main shaft and enmeshed with said gears of the auxilliary shafts at a gear ratio of 1:1;

d. said stator having three compartments, namely, a working chamber in the middle, a crankcase in the front and a gear box in the rear, i. said working chamber comprises:

1. a shell with a right circular cylindrical internal surface, 2. a pair of diametrically opposed stator vanes with concave axial edges coaxially and inwardly projecting from said shell, 3. front and rear transverse end plates, 4. a pair of longitudinal cylindrical holes for journalling the two hollow tubes of the forced porting mechanisms in said stator vanes, 5. a pair of diagonal air inlets, one in each stator vane, with identical diameter and relative axial location as those of the air outlets of said forced porting mechanisms, and 6. a pair of diagonal exhaust outlets, one in each stator vane, with identical dimensions and relative transverse location as those of said air inlets of the stator vanes, as well as with identical diameter and relative axial location as those of said exhaust inlets of the forced porting mechanisms;

ii. said crankcase comprises:

1. a crank case body which is recessed to accommodate the cranking mechanisms, the big gear of the main shaft, the porting gears and lubricating oil, 2. a central longitudinal bore with gas seal and anti-friction bearing in said crankcase body, 3. a pair of longitudinal blind holes with anti-friction bearings in said crankcase body for journalling the rear journals of the cranking mechanisms, 4. a crank case cover plate, 5. a pair of longitudinal blind holes with anti-friction bearings in the crankcase cover plate for journalling the front journals of the cranking mechanisms, and 6. three longitudinal holes with anti-friction bearings and oil seals in said crank case cover plate for journalling the hollow tubes and the main shaft;

iii. said gear box comprises:

1. a gear box body which is recessed to accommodate the small gear of the main shaft, the gears of the auxilliary shafts and lubricating oil, 2. a central longitudinal bore with gas seal and anti-friction bearing in said gear box body, 3. a pair of longitudinal blind holes with anti-friction bearings in said gear box body for journalling the gears of the auxilliary shafts, 4. a gear box cover plate, 5. a pair of longitudinal holes with anti-friction-bearings and oil seals in the gear box cover plate for journalling the auxilliary shafts, and 6. three longitudinal holes with anti-friction bearings and oil seals in the gear box cover plate for journalling the hollow tubes and the main shaft;

e. a rotor coaxially and rotatably mounted in said working chamber of said stator having i. a right circular cylinder journalled for rotation between the concave axial edges of the stator vanes, ii. a pair of diametrically opposed rotor vanes with convex axial edges outwardly projecting from said rotor cylinder and journalled for axial rotation in the shell cylinder, iii. a pair of axially opposed journals coaxially and outwardly projecting from said rotor cylinder as well as journalled for axial rotation in said central longitudinal bores of the crankcase body and gear box body, iv. a central axial hole with sleeve bearing for journalling the main shaft, and v. a pair of diametrically opposed axial pins which are equidistant from the axis and axially projecting from transverse face of the front rotor journal, each pin being journalled in the other end of the connecting rod of the cranking mechanism;

f. said four arcuate combustion chambers are each bounded by:

i. the right circular cylindrical internal surface of the shell, the rotor cylinder and the transverse end plates functioning as engine cylinder, ii. the two stator vanes serving as cylinder heads, and iii. the two adjacent rotor vanes corresponding to pistons; and g. longitudinal grooves in the concave axial edges of the stator vanes and convex axial edges of the rotor vanes as well as transverse grooves in plane radial edges of the rotor vanes containing hot air and gases serving as lubricant and dynamic seals.

* * * * *